(12) United States Patent
Nishiyama et al.

(10) Patent No.: US 6,466,462 B2
(45) Date of Patent: Oct. 15, 2002

(54) DC/DC CONVERTER HAVING A CONTROL CIRCUIT TO REDUCE LOSSES AT LIGHT LOADS

(75) Inventors: Tomohiro Nishiyama, Tokyo (JP); Yoshinao Naito, Tokyo (JP); Koji Takada, Tokyo (JP); Masuo Hanawaka, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 10/011,456

(22) Filed: Oct. 30, 2001

(65) Prior Publication Data

US 2002/0067624 A1 Jun. 6, 2002

(30) Foreign Application Priority Data

Oct. 31, 2000 (JP) .......................................... 2000/332313
Apr. 19, 2001 (JP) .......................................... 2001/120720

(51) Int. Cl.[7] ............................................. H02M 3/335
(52) U.S. Cl. .................................... 363/21.11; 363/21.06
(58) Field of Search ........................... 363/21.04, 21.06, 363/21.07, 21.11, 21.1, 21.09

(56) References Cited

U.S. PATENT DOCUMENTS 5,870,299 A * 2/1999 Rozman ...................... 363/127
5,872,705 A * 2/1999 Loftus et al. ................ 363/127

* cited by examiner

*Primary Examiner*—Shawn Riley
(74) *Attorney, Agent, or Firm*—Moonray Kojima

(57) ABSTRACT

A DC/DC converter having a control circuit to reduce losses at light load, wherein a first control device turns ON and OFF power to the primary winding of the transformer of the DC/DC converter according to the difference between the output voltage of the DC/DC converter and the desired output voltage, and a second control device turns ON a switching device of a clamping circuit connected to the primary winding for a desired length of time after the first control device turns OFF the power to the primary winding.

26 Claims, 25 Drawing Sheets

DC/DC CONVERTER HAVING A CONTROL CIRCUIT TO REDUCE LOSSES AT LIGHT LOADS

BACKGROUND OF THE INVENTION

1. Field of the Invention

The present invention relates to a DC/DC converter and a control method thereof and, more particularly, to a DC/DC converter and a control method thereof whereby losses at a light load are reduced.

2. Description of the Prior Art

In a switching power supply or other power supply systems, a DC/DC converter is used as a device for isolatedly converting a DC input voltage to feed power to a load circuit. The DC/DC converters configured for such purposes are classified into the forward and flyback types depending on the difference in polarity between the primary and secondary windings of an isolation transformer. Examples of forward DC/DC converters are the converters disclosed in the U.S. Patents U.S. Pat. No. 4,441,146 and U.S. Pat. No. 4,959,764. Now, such a device as mentioned above is described.

FIRST EXAMPLE OF PRIOR ART DC/DC CONVERTER

FIG. 1 is the circuit diagram of a first example of a prior art DC/DC converter.

In FIG. 1, a symbol V11 denotes a DC input power supply, symbols C11, C12, C13 and C21 denote capacitors, symbols Q11 and Q12 denote switching devices, symbols D11, D12, D21 and D22 denote diodes, symbols Np and Ns denote windings, a symbol L21 denotes a coil, a symbol Lr denotes a leakage inductance, a symbol A denotes an error amplifier, and symbols CTL11 and CTL12 denote controllers. The capacitor C13 and switching device Q12 form an active clamp circuit, whereas the windings Np and Ns form a transformer T1 and the D21 and D22 form a rectifying circuit.

The positive-voltage side of the DC input power supply V11 is connected to one end of the capacitor C13 and one end of the winding Np. At this point, the leakage inductance Lr of the transformer T1 develops across those ends of the capacitor C13 and winding Np. The other end of the capacitor C13 is connected to one end of the switching device Q12. The winding Np is a primary winding, the other end of which is connected to one end of the switching device Q11. The switching device Q12 is a sub-switching device, the other end of which is connected to one end of the switching device Q11. The switching device Q11 is a main switching device, the other end of which is connected to the negative-voltage side of the DC input power supply V11.

The cathodes of the diodes D11 and D12 are respectively connected to one end each of the switching devices Q11 and Q12. The anodes of the diodes D11 and D12 are respectively connected to the other ends of the switching devices Q11 and Q12. The capacitors C11 and C12 are parallel-connected to the switching devices Q11 and Q12, respectively. The diode D11, capacitor C11 and switching device an Q11 form a MOSFET, wherein one end of the switching device Q11 serves as the drain and the other end as the source. Likewise, the diode D12, capacitor C12 and switching device Q12 form a MOSFET, wherein one end of the switching device Q12 serves as the drain and the other end as the source.

The winding Ns is a secondary winding, one end of which is connected to the anode of the diode D21 and the other end is connected to the anode of the diode D22. The diode D21 is a forward rectifier, the cathode of which is connected to one end of the coil L21. The diode D22 is a fly-wheel rectifier, the cathode of which is connected to one end of the coil L21. The coil L21 is an inductance device, the other end of which is connected to one end of the capacitor C21. The capacitor C21 is a smoothing capacitor, the other end of which is connected to the other end of the winding Ns. The negative end of the error amplifier A is connected to one end of the capacitor C21 and the positive end is connected to the other end of the capacitor C21 through a voltage reference (desired output voltage). Thus, the amplifier outputs a feedback signal which is the difference between the output voltage of the DC/DC converter and the desired output voltage. The controllers CTL11 and CTL12 turn on and off the switching devices Q11 and Q12, respectively.

Next, specific examples of the configurations of the controllers CTL11 and CTL12 are shown in FIG. 2 and described. The controller CTL11 is composed of an oscillator 11, a pulse width modulation (PWM) circuit 12, a delay circuit 13, and a driver 14. The oscillator 11 outputs an oscillation frequency signal. The PWM circuit 12 outputs a PWM signal according to the oscillation frequency signal from the oscillator 11 and the feedback signal from the error amplifier A. The delay circuit 13 delays the PWM signal of the PWM circuit 12. The driver 14 is given the output of the delay circuit 13, so that the driver turns on and off the switching device Q11. Each of these circuit elements is grounded to the negative-voltage side of the DC input power supply V11.

The controller CTL12 is composed of a delay circuit 21, a level shift circuit 22, and a driver 23. The delay circuit 21 is grounded to the negative-voltage side of the DC input power supply V11 and delays the PWM signal of the PWM circuit 11. The level shift circuit 22 is grounded to the negative-voltage side of the DC input power supply V11 and the other end of the switching device Q12. Thus, the level shift circuit 22 outputs a signal whose level is shifted to a high voltage, according to the output of the delay circuit 21 and the PWM signal of the PWM circuit 12. The driver 23 is grounded to the other end of the switching device Q12, and given the output of the level shift circuit 22 so that the driver turns on and off the switching device Q12.

Now, such a DC/DC converter as explained above is described by first referring to the general behavior thereof. The controllers CTL11 and CTL12 alternately turn on and off the switching devices Q11 and Q12, wherein a dead time is set in order to prevent the switching devices from turning on at the same time.

As indicated by a solid-line arrow in FIG. 1, a current flows through the diode D21 during the period wherein the switching device Q11 is on and the switching device Q12 is off. This current causes another current to be supplied to a load, which is not shown in the figure, and energizes the secondary-side coil L21 so that energy is stored therein.

During the period before the switching device Q11 turns off and switching device Q12 turns on, the current flowing through the diode D21 decreases and the current flowing through the diode D22 increases.

As indicated by a dashed-line arrow in FIG. 1, a current flows through the diode D22 during the period wherein the switching device Q11 is off and the switching device Q12 is on, because of the energy stored in the coil L21.

During the period before the switching device Q12 turns off and switching device Q11 turns on, the current flowing through the diode D22 decreases and the current flowing through the diode D21 increases.

Next, behaviors of the controllers CTL11 and CTL12 are described by first explaining their behaviors under a normal load, using FIG. 3. FIG. 3 is a timing chart showing the behavior of the DC/DC converter of FIG. 2 under a normal load. In FIG. 3, a symbol (a) denotes the drain-source voltage Vds of the switching device Q11, a symbol (b) denotes the drain-source current Ids of the switching device Q11, a symbol (c) denotes the drain-source voltage Vds of the switching device Q12, a symbol (d) denotes the drain-source current Ids of the switching device Q12, a symbol (e) denotes the gate-source voltage Vgs of the switching device Q11, i.e., the output of the driver 14, a symbol (f) denotes the output of the oscillator 11, a symbol (g) denotes the output of the PWM circuit 12, a symbol (h) denotes the output of the delay circuit 13, a symbol (i) denotes the gate-source voltage Vgs of the switching device Q12, i.e., the output of the driver 23, a symbol (j) denotes the output of the delay circuit 21, and a symbol (k) denotes the output of the level shift circuit 22.

At a time t0, the output of the oscillator 11 goes high. The PWM circuit 12 outputs a high-state signal when the feedback signal of the error amplifier A is high. This output signal causes the level shift circuit 22 to output a low-state signal. This output signal causes the driver 23 to turn on the switching device Q12.

At a time t1, the delay circuit 13 causes the PWM circuit 12 to output a delayed signal, lest the main switching device Q11 and the sub-switching device Q12 turn on at the same time. The output of the delay circuit 13 causes the driver 14 to turn on the switching device Q11.

At a time t2, the PWM circuit 12 inverts the signal thereof and outputs the signal to the delay circuits 13 and 21 and the level shift circuit 23 when a pulse width appropriate for the voltage of the feedback signal of the error amplifier A is reached. The signal of the delay circuit 21 rises when the signal of the PWM circuit 12 falls, lest the switching devices Q11 and Q12 turn on at the same time.

At a time t3, the output of the driver 14 goes low when the delay circuit 13 inverts the output thereof, thus turning off the switching device Q11. The delay circuit 21 remains high with the signal thereof kept delayed.

At a time t4, the signal of the delay circuit 21, when inverted, is amplified by the driver 23 so as to turn on the switching device Q12. The switching device Q12 remains on until the PWM circuit 12 inverts the output thereof once again (at a time t5).

Next, the behavior of the DC/DC converter under a light load is described by referring to FIG. 4. FIG. 4 is a timing chart showing the behavior of the DC/DC converter of FIG. 2 under a light load. In FIG. 4, a symbol (a) denotes the gate-source voltage Vgs of the switching device Q11, i.e., the output of the driver 14, a symbol (b) denotes the gate-source voltage Vgs of the switching device Q12, i.e., the output of the driver 23, a symbol (c) denotes the feedback signal of the error amplifier A, a symbol (d) denotes the output of the oscillator 11, a symbol (e) denotes the output of the PWM circuit 12, a symbol (f) denotes the output of the delay circuit 13, a symbol (g) denotes the output of the delay circuit 21, and a symbol (h) denotes the output of the level shift circuit 22.

During the period from a time t0 to a time t1, the switching device Q11 is prohibited from turning on when the feedback signal from the error amplifier A is low, even if the signal of the oscillator 11 is input to the PWM circuit 12. When the switching device Q11 becomes unable to turn on, a voltage is kept applied to the gate of the sub-switching device Q12, thus causing the sub-switching device Q12 to remain on. At this point, the clamp capacitor C13 and the leakage inductance Lr of the transformer T1 produce resonance, causing electricity stored in the capacitor C13 to discharge.

At a time t1, if a signal is input from the oscillator 11 to the PWM circuit 12 when the feedback signal is high, the output signal of the PWM circuit 12 is inverted. Consequently, a signal is input to the level shift circuit 22 and therefore the switching device Q12 turns off. Concurrently, the signal from the PWM circuit 12 is input to the delay circuit 13. Then, after a given delay, the switching device Q11 is turned on by the driver 14.

At a time t2, the signal of the PWM circuit 12 reaches a pulse width appropriate for the feedback signal of the error amplifier A, and is inverted. Following the inversion, the delay circuit 13 also inverts the signal thereof after a given delay, so that the switching device Q11 is turned of f by the driver 14 and therefore the capacitor C13 is charged. Concurrently, the signal of the PWM circuit 12 is input to the delay circuit 21, causing the signal thereof to rise.

At a time t3, the delay circuit 21 inverts the output signal thereof after a delay from the rise of the output so as not to cause the switching devices Q11 and Q12 to turn on at the same time. The output of the delay circuit 21 causes the level shift circuit 22 to invert the signal thereof, so that the switching device Q12 is turned off by the driver 23. At a time t4, the DC/DC converter goes back to the state existing at the time t0.

This means that under a light load, the DC/DC converter goes into intermittent oscillation wherein the main switching device Q11 is at a stop for a certain period because of the response characteristics of feedback control. Since the sub-switching device Q12 remains on during the period wherein the switching device Q11 is at a stop, electricity charged into the clamp capacitor C13 is discharged because of resonance produced by the capacitor C13 and the leakage inductance Lr. Consequently, the amount of energy of $0.5CV^2f$ (C=capacitance of capacitor C13, V=voltage applied to capacitor C13, and f=output frequency of oscillator 11) is consumed as a loss.

For environmental reasons, there is a need to reduce the energy loss of electronic equipment, particularly to reduce the loss in the stand-by state of such equipment. Although the DC/DC converter with an active clamp circuit goes into intermittent oscillation under a light load, the sub-switching device Q12 remains on even if the main switching device Q11 turns off. This results in the problem that electricity stored in the clamp capacitor C13 is discharged and therefore large losses are unavoidable.

SECOND EXAMPLE OF PRIOT ART DC/DC CONVERTER

FIG. 5 is the circuit diagram of a second example of the prior art DC/DC converter. In FIG. 5, symbols C1 to C3 denote capacitors, symbols Q1 to Q4 denote n-type MOSFETs, symbols Np, Ns, Nfw, Nfl and Ni denote windings, a symbol L1 denotes a coil, a symbol RL denotes a load circuit, a symbol A denotes an error amplifier, and a symbol CTL denotes a controller. The windings Np, Ns, Nfw, Nfl and Ni form a transformer T1 and the MOSFETs Q3 and Q4 form a rectifying circuit. Note that the windings Np, Ns and Ni are correlated with one another as Np≧Ns>Ni in terms of the winding ratio.

One end of the capacitor C1 is connected to one end each of the capacitor C2 and winding Np. The other end of the capacitor C2 is connected to the drain of the MOSFET Q2. The winding Np is a primary winding, the other end of which is connected to the drain of the MOSFET Q1. The MOSFET Q2 is a sub-switch, the source of which is connected to the drain of the MOSFET Q1. The MOSFET Q1 is a main switch, the source of which is connected to the other end of the capacitor C1.

The winding Ns is a secondary winding, one end of which is connected to the source of the MOSFET Q3 and the other end is connected to the source of the MOSFET Q4. The winding Nfw is a drive winding, one end of which is connected to the source of the MOSFET Q3 and the other end is connected to the gate of the MOSFET Q3. The winding Nfl is also a drive winding, one end of which is connected to the source of the MOSFET Q4 and the other end is connected to the gate of the MOSFET Q4.

The MOSFETs Q3 and Q4 are first and second switches, the drains of which are connected to one end of the winding Ni. The other end of the winding Ni is connected to one end of the coil L1. The coil L1 is an inductance device, the other end of which is connected to one end of the capacitor C3. The capacitor C3 is an output capacitor, the other end of which is connected to the other end of the winding Ns. The load circuit RL is parallel-connected to the capacitor C3.

The negative end of the error amplifier A is connected to one end of the capacitor C1 and the positive end is connected to the other end of the capacitor C1 through a voltage reference. The controller CTL provides output to the gates of the MOSFETs Q1 and Q2 according to the output of the error amplifier A.

Now, such a DC/DC converter as explained above is described. FIGS. 6 and 7 are timing charts showing the behavior of the DC/DC converter of FIG. 5, wherein FIG. 7 is an enlarged view of FIG. 6. In FIGS. 6 and 7, a symbol (a) denotes the drain-source voltage Vds of the MOSFET Q1, a symbol (b) denotes the drain current Id of the MOSFET Q1, a symbol (c) denotes the drain current Id of the MOSFET Q2, a symbol (d) denotes the current IL of the coil L1, a symbol (e) denotes the gate-source voltage Vgs of the MOSFET Q2, a symbol (f) denotes the gate-source voltage Vgs of the MOSFET Q1, a symbol (g) denotes the gate-source voltage Vgs of the MOSFET Q3, and a symbol (h) denotes the gate-source voltage Vgs of the MOSFET Q4. A symbol (i) denotes the current INs of the winding Ns, a symbol (j) denotes the voltage VNs of the winding Ns, a symbol (k) denotes the voltage VNi of the winding Ni, a symbol (l) denotes the voltage VL1 of the coil L1, a symbol (m) denotes the drain current Id of the MOSFET Q4, a symbol (n) denotes the output current Ig of the capacitor C1, a symbol (o) denotes the voltage VC2 of the capacitor C2, and a symbol (p) denotes an output voltage Vo.

FIGS. 8 to 13 are circuit diagrams for explaining the behavior of the DC/DC converter of FIG. 5, and are indicated as equivalent circuits. FIG. 8 shows the polarity of each voltage, whereas FIGS. 9 to 13 illustrate the converter's behavior for a time t3–t4 period, time t4–t5 period, time t5–t6 period, time t6–t7 period, and time t7–t8 period, respectively.

(1) Time t0–t1, Time t1–t2 and Time t2–t3 Periods

The capacitor C1 is a smoothing capacitor for changing a voltage provided by an AC power supply, which is not shown in the figure, into a DC voltage, and serves as a DC power supply. The error amplifier A compares the output voltage Vo with the level of the voltage reference. According to the result of comparison, the controller CTL turns on and off the MOSFETs Q1 and Q2 alternately, thereby keeping the output voltage Vo constant. Then, the DC voltage of the capacitor C1 is changed to a different voltage through the transformer T1.

In that case, the transformer T1 (drive windings Nfw and Nfl) causes the MOSFET Q3 to turn on and the MOSFET Q4 to turn off when the MOSFET Q1 is on. Conversely, the transformer T1 causes the MOSFET Q3 to turn off and the MOSFET Q4 to turn on when the MOSFET Q1 is off.

When the MOSFET Q3 is on, the current INs of the winding Ns charges the capacitor C3. When the MOSFET Q4 is on, the capacitor C3 is also charged by the inductance of the winding Ni and coil L1. The winding Ni reduces any ripple current to zero.

The capacitor C3 supplies power to the load circuit RL. Note that the time t0–t3 period is represented by the general behavior of the DC/DC converter and, therefore, excluded from the detailed description of the converter's behavior.

(2) Time t3–t4 Period (FIG. 9)

During the period wherein the MOSFET Q2 is on, the output capacity of the MOSFET Q2 will have been discharged down to the forward voltage level of the MOSFET's body diode. This means that the MOSFET Q2 turns off at a time t3. Consequently, a current flows from the clamp capacitor C2 to the winding Np of the transformer T1, thus charging the output capacity of the MOSFET Q2 up to a level equal to the voltage of the capacitor C2. Therefore, the drain-source voltage Vds of the MOSFET Q1 decreases to the voltage Vg of the input smoothing capacitor C1. As the result of a current flowing through the winding Np, the winding Nfl causes the MOSFET Q4 to turn on and the capacitor C3 to be discharged.

(3) Time t4–t5 Period (FIG. 10)

At a time t4, the controller CTL detects a light-load state (including no load) according to the output of the error amplifier A, and turns off the MOSFETs Q1 and Q2. This strategy is intended to reduce switching losses. The reason why the MOSFET Q2 is also turned off is because energy stored in the clamp capacitor C2 is discharged through a short-circuit consisting of the MOSFET Q2 and the winding Np of the transformer T1, causing losses to occur.

At a time t4, the current flowing from the clamp circuit (capacitor C2 and MOSFET Q2) to the winding Np comes to a stop. However, the current is forced to flow continuously by the leakage inductance of the winding Np. Consequently, the body diode of the MOSFET Q1 turns on and a current flows through the winding Np into the input smoothing capacitor C1.

Since the body diode of the MOSFET Q1 turns on, the drain-source voltage Vds of the MOSFET Q1 decreases down to the forward voltage level of the body diode.

The current thus produced causes the polarity of each winding to be reversed, and the winding Nfw causes the MOSFET Q3 to turn on. Once the MOSFET Q3 turns on, a discharge takes place in the direction from the secondary-side smoothing capacitor C3 through the windings Ns and Np to the primary-side smoothing capacitor C1, since "number of turns of winding Ns>number of turns of winding Ni."

As the capacitor C1 is charged, the current being charged thereinto, i.e., the drain current Id of the MOSFET Q1, decreases and reaches zero finally.

(4) Time t5–t6 Period (FIG. 11)

At a time t5, the MOSFET Q3 is still on. This means that the current IL flowing through the coil L1 also flows through the windings Ni and Ns into the winding Np. Consequently, the output capacity of the MOSFET Q2, which has been charged in reverse polarity during the time t3–t4 period, is now charged up to the forward voltage level of the MOSFET Q2's body diode. When the output capacity of the MOSFET Q2 is charged, the body diode thereof turns on and charges the capacitor C2. As the capacitor C2 is charged, the current IL of the coil L1 decreases.

(5) Time t6–t7 Period (FIG. 12)

Because of resonance produced by the capacitor C2, the output capacity of the MOSFET Q2 and the winding Np, a current begins to flow from the capacitor C2 to the winding Np. Consequently, the polarity of each winding reverses, causing the winding Nfl to turn on the MOSFET Q4 and therefore the current IL to flow in the opposite direction.

(6) Time t7–t8 Period (FIG. 13)

Because of resonance produced by the capacitor C2, the output capacity of the MOSFET Q2 and the winding Np, the polarity of each winding reverses once again, causing the winding Nfw to turn on the MOSFET Q3.

Since the converter's behavior during the above-mentioned period is the same as that during the time t3–t4 period and the polarities of each voltage and current at a time t8 are also the same as those at the time t4, oscillation continues.

As described heretofore, the prior art DC/DC converter is placed in intermittent operation as a measure against losses under a light load. However, energy stored in the secondary-side smoothing capacitor C3 is re-generated on the primary side because of abnormal oscillation caused when the DC/DC converter is at a stop, causing the output voltage Vo to decrease rapidly. For this reason, losses at a light load increase, causing the problem that the period during which the DC/DC converter in intermittent operation is at a stop, becomes shorter.

SUMMARY OF THE INVENTION

An object of the present invention is to provide a DC/DC converter and a control method thereof whereby losses at a light load are reduced.

DETAILED DESCRIPTION OF THE PREFERRED EMBODIMENTS

Preferred embodiments of the present invention will now be described in detail by referring to the accompanying drawings.

First Embodiment

Figure 1:
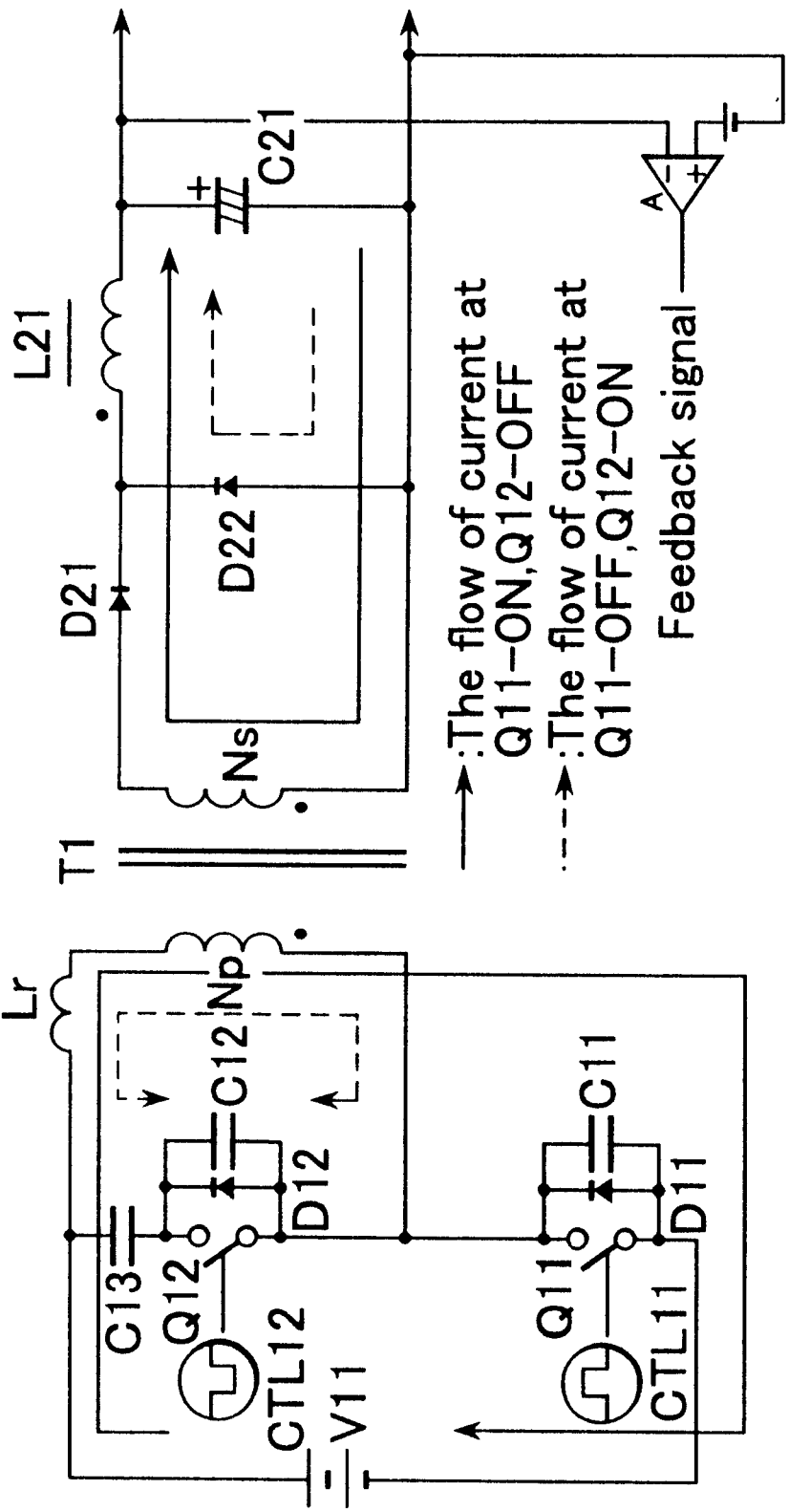
FIG. 1 is the circuit diagram of a first example of the prior art DC/DC converter.
Figure 2:
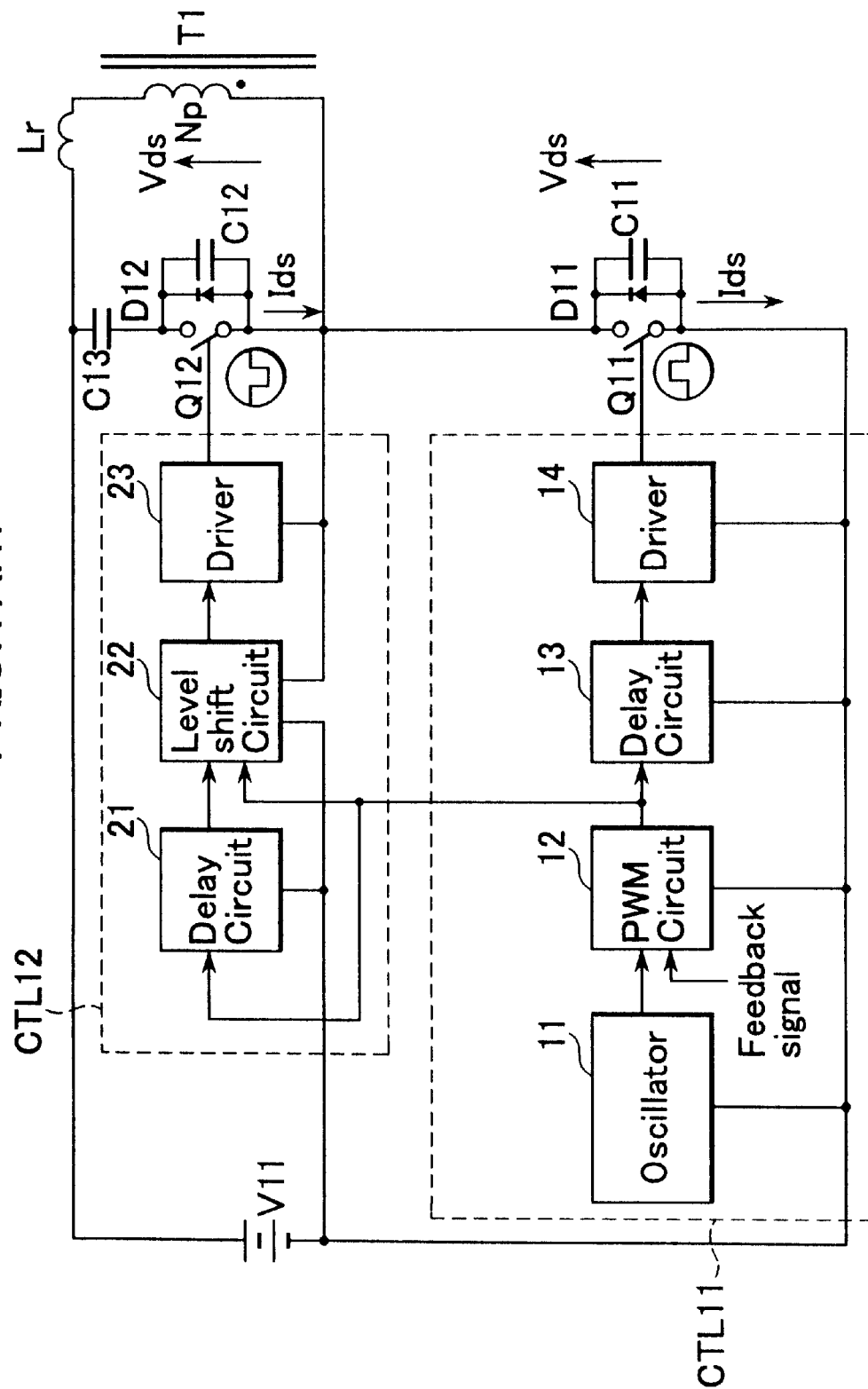
FIG. 2 is a circuit diagram showing main elements in the first example of the prior art DC/DC converter of FIG. 1.
Figure 14:
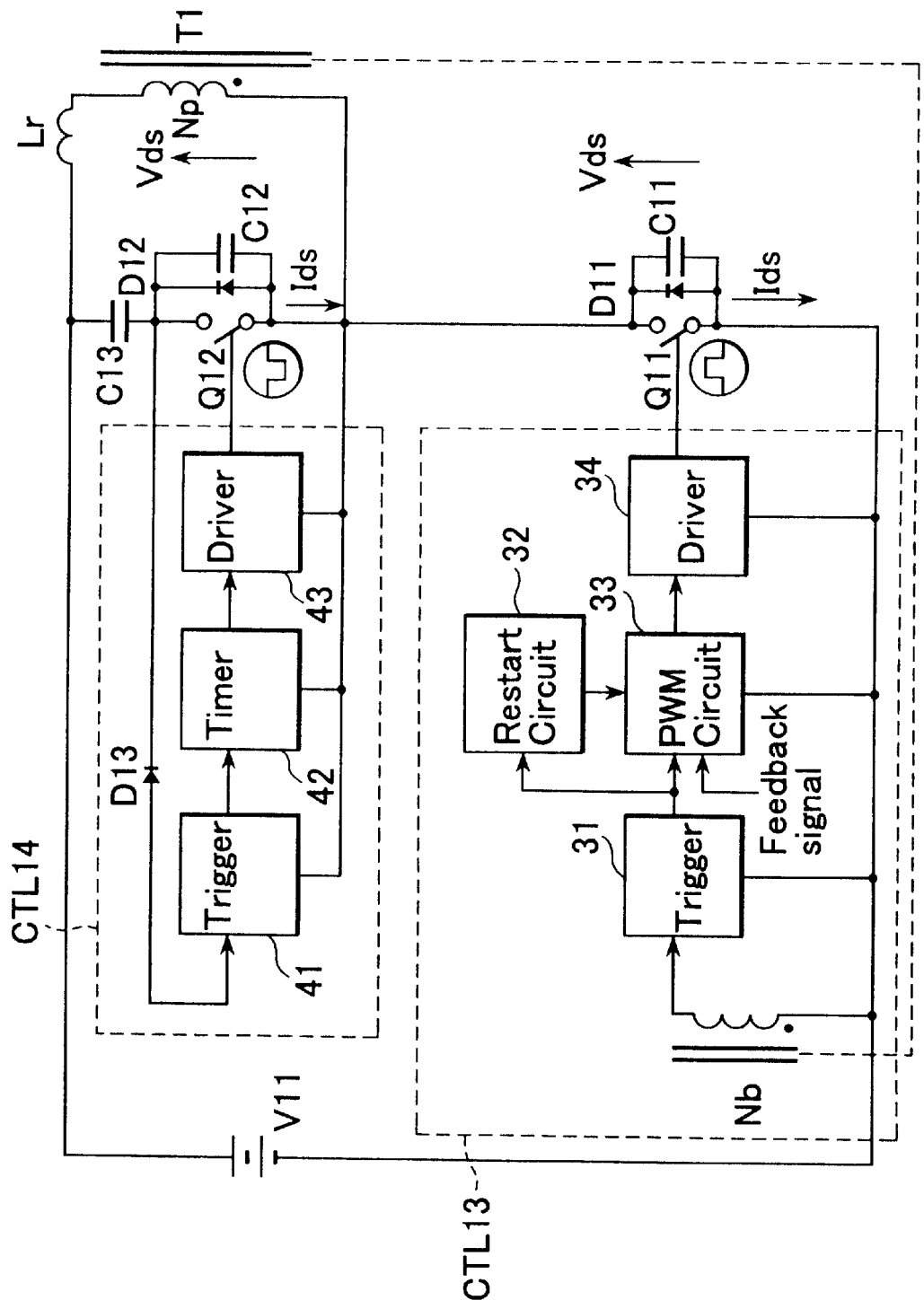
FIG. 14 is a circuit diagram showing a first embodiment of the present invention.

FIG. 14 is a circuit diagram showing a first embodiment of the present invention and main elements therein. Note that the DC/DC converter of FIG. 14 is an improved version of the DC/DC converter shown in FIG. 1 or FIG. 2, and that elements identical to those shown in FIG. 1 or FIG. 2 are referenced alike and excluded from the description.

In FIG. 14, a first controller CTL13 turns on and off a main switching device Q11 according to the feedback signal of an error amplifier A. A second controller CTL14 keeps a switching device Q12 turned on for a desired period after the main switching device Q11 is turned off.

The controller CTL13 comprises an auxiliary winding Nb, a trigger 31, a restart circuit 32, a PWM circuit 33, and a driver 34. The auxiliary winding Nb is provided in a transformer T1, and one end of the winding is connected to the negative-voltage side of a DC input power supply V11, in order to detect a voltage change in a winding Np. The trigger 31 is connected to the other end of the auxiliary winding Nb, in order to detect the turning off of the sub-switching device Q12 by means of a voltage change in the auxiliary winding Nb and output a trigger signal. The restart circuit 32 is reset by the trigger signal of the trigger 31, and outputs a restart signal each time a given length of time (fixed length of time in this embodiment) elapses. The PWM circuit 33 outputs a PWM signal according to the trigger signal of the trigger 31, the restart signal of the restart circuit 32, and the feedback signal of the error amplifier A. The driver 34 is given the PWM signal of the PWM circuit 33, in order to turn on and off the switching device Q11. Each of these circuit elements is grounded to the negative-voltage side of the DC input power supply V11.

The controller CTL14 comprises a diode D13, a trigger 41, a timer 42, and a driver 43. The cathode of the diode D13 is connected between the capacitor C13 and the switching device Q12. The trigger 41 is connected to the anode of the diode D13, and outputs a trigger signal. The timer 42 is a pulse-width circuit and is given the trigger signal of the trigger 41 to set a desired pulse width. The driver 43 is given the output of the timer 42, in order to turn on and off the switching device Q12. Each of these circuit elements is grounded to the other end of the switching device Q12.

Figure 3:
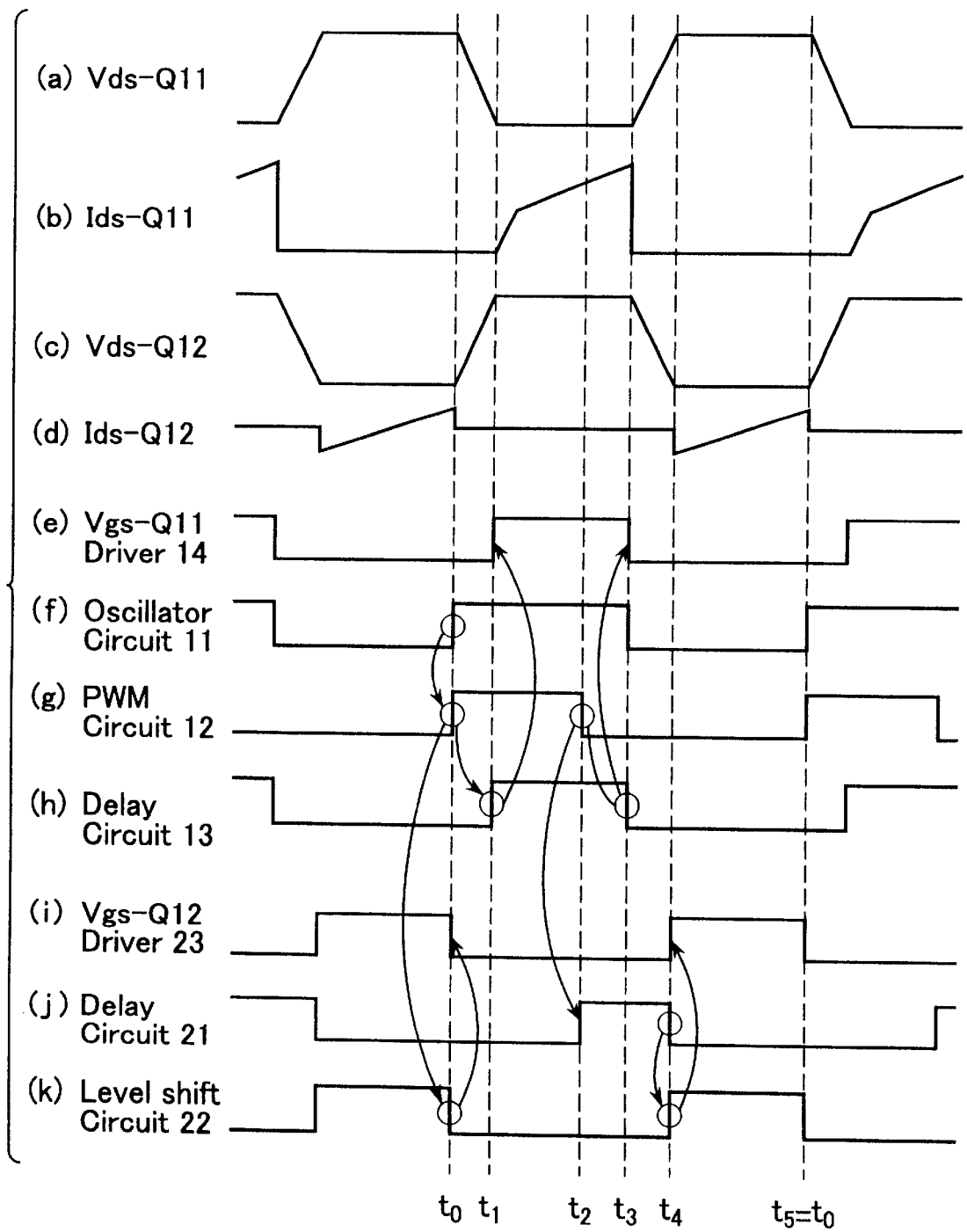
FIG. 3 is a timing chart showing the behavior of the DC/DC converter of FIG. 2.
Figure 4:
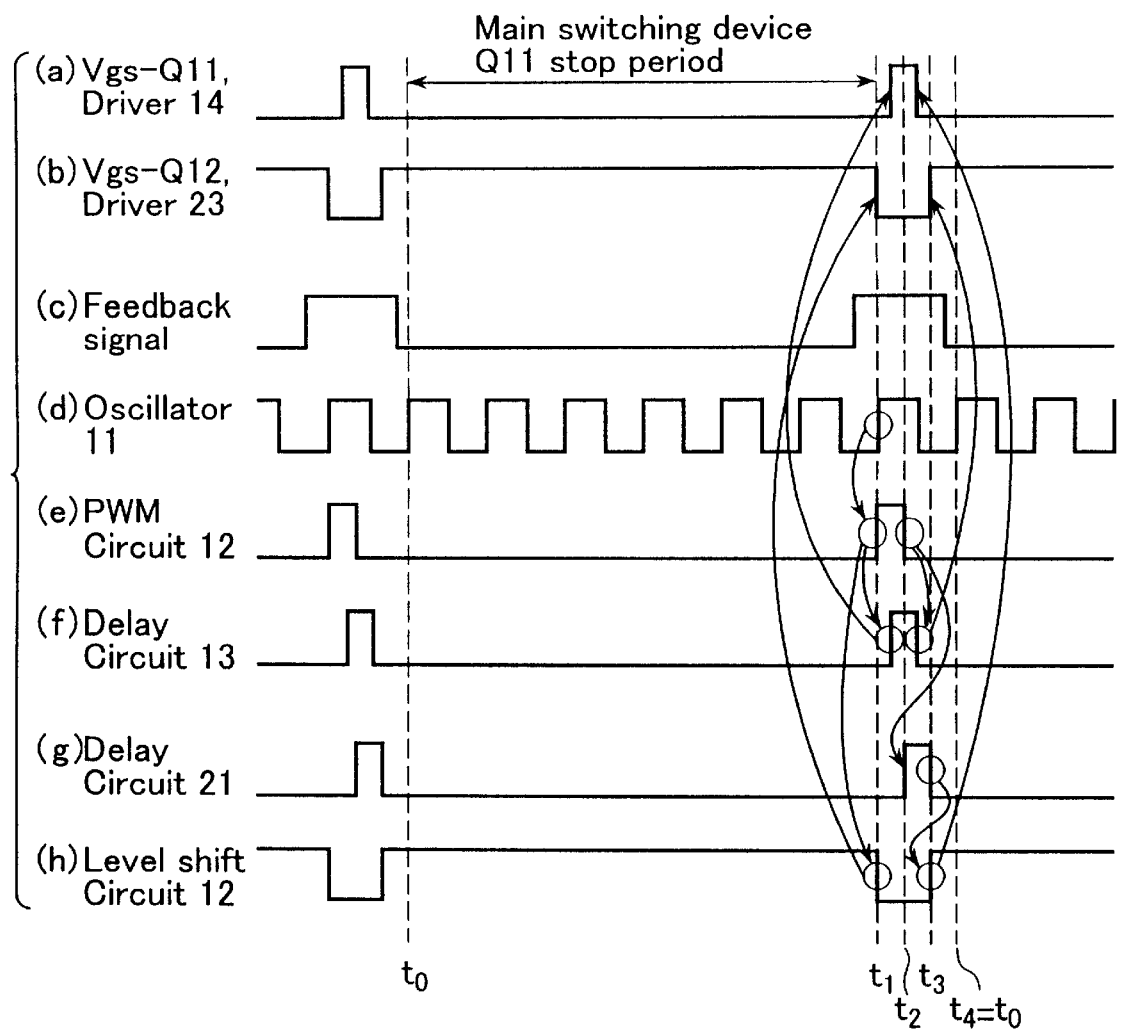
FIG. 4 is another timing chart showing the behavior of the DC/DC converter of FIG. 2 under a light load.
Figure 15:
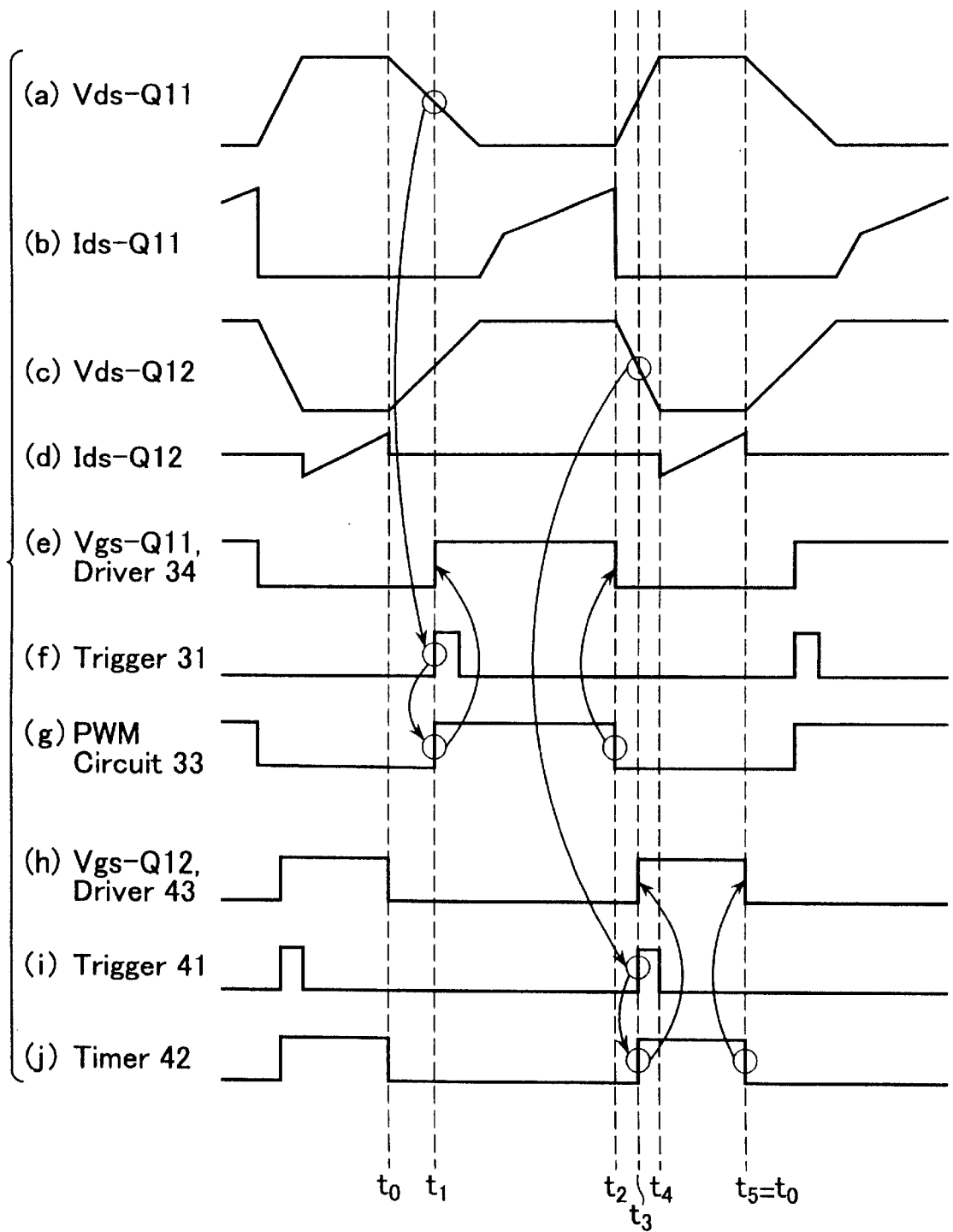
FIG. 15 is a timing chart showing the behavior of the DC/DC converter of FIG. 14 under a normal load.

Now, such a DC/DC converter as explained above is described. Note that the general behavior of the DC/DC converter is the same as that of the DC/DC converter of FIG. 1 or FIG. 2, and is therefore not described here. Firstly, the converter's behavior under a normal load is described by referring to FIG. 15. FIG. 15 is a timing chart showing the behavior of the DC/DC converter of FIG. 14 under a normal load. In FIG. 15, symbols (a) to (d) denote the same signals as those denoted in FIG. 3. A symbol (e) denotes the gate-source voltage Vgs of the switching device Q11, i.e., the output of the driver 34, a symbol (f) denotes the output of the trigger 31, a symbol (g) denotes the output of the PWM circuit 33, a symbol (h) denotes the gate-source voltage Vgs of the switching device Q12, i.e., the output of the driver 43, a symbol (i) denotes the output of the trigger 41, and a symbol (j) denotes the output of the timer 42.

At a time t0, the flow of a current in the winding Np reverses and the voltage of the auxiliary winding Nb is inverted when the sub-switching device Q12 turns off. This means that the drain-source voltage of the switching device Q12 is inverted and begins to rise. The rise in the drain-source voltage Vds of the switching device Q12 is input to the trigger 31 through the winding Np and auxiliary winding Nb.

At a time t1, the voltage of the auxiliary winding Nb exceeds a given level, causing the trigger 31 to output a trigger signal (oneshot pulse signal). This trigger signal causes the PWM circuit 33 to invert the signal thereof and output the signal to the driver 34. Then, the driver 34 amplifies the signal to turn on the main switching device Q11.

At a time t2 after the switching device Q11 turns on, the PWM circuit 33 inverts the preset PWM signal according to the magnitude of the feedback signal from the error amplifier A, so that the output of the DC/DC converter is kept constant. Consequently, the driver 34 zeroes the output thereof and turns off the switching device Q11. When the switching device Q11 is turned off, the drain-source voltage of the switching device Q12 begins to decrease.

At a time t3, the trigger 41 detects a drop in the drain-source voltage of the switching device Q12 through the diode D13, and outputs a trigger signal (oneshot pulse signal). The signal is amplified by the driver 43 through the timer 42 to turn on the switching device Q12.

At a time t4, the trigger signal of the trigger 41 terminates, but the timer 42 continues to provide the output thereof.

At a time t5, when a given length of the on-state period of the switching device Q12 elapses, the timer 42 expires and zeroes the output thereof. Consequently, the driver 43 also zeroes the output thereof and turns off the switching device Q12.

This means that the switching devices Q11 and Q12 on the primary side operate in self-excited oscillation mode wherein the devices turn on by detecting the operating waveform of the DC/DC converter.

Figure 16:
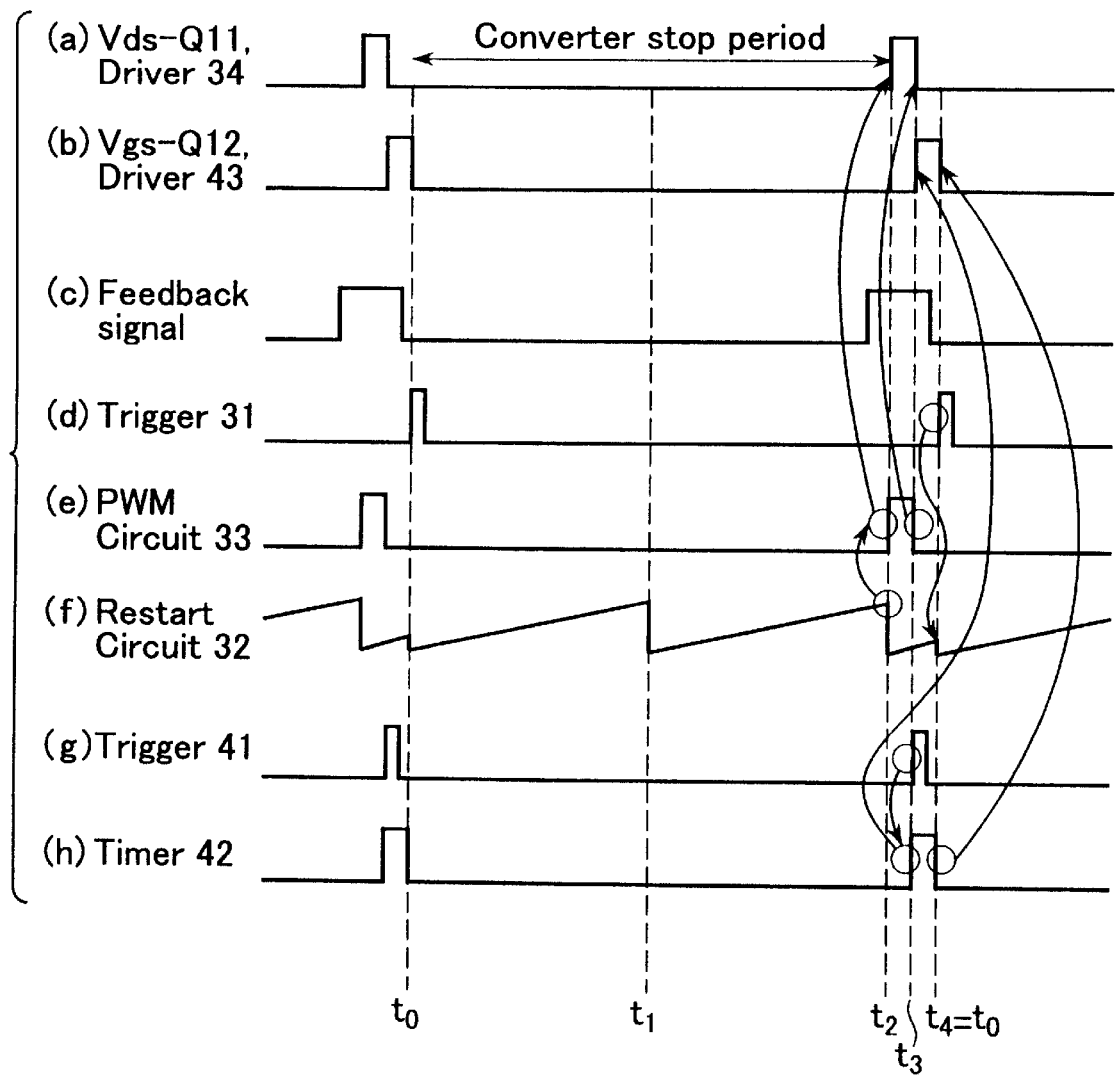
FIG. 16 is a timing chart showing the behavior of the DC/DC converter of FIG. 14 under a light load.

Next, the converter's behavior under a light load is described by referring to FIG. 16. FIG. 16 is a timing chart showing the behavior of the DC/DC converter of FIG. 14 under a light load. In FIG. 16, a symbol (a) denotes the gate-source voltage Vgs of the switching device Q11, i.e., the output of the driver 34, a symbol (b) denotes the gate-source voltage Vgs of the switching device Q12, i.e., the output of the driver 43, a symbol (c) denotes the feedback signal of the error amplifier A, a symbol (d) denotes the output of the trigger 31, a symbol (e) denotes the output of the PWM circuit 33, a symbol (f) denotes the lapse of time in the restart circuit 32, a symbol (g) denotes the output of the trigger 41, and a symbol (h) denotes the output of the timer 42.

At a time t0, the PWM circuit 33 does not provide any output even if the trigger 31 outputs a trigger signal, since the feedback signal of the error amplifier A is low. The restart circuit 32 is reset by the trigger signal and resumes timer operation.

At a time t1, the restart circuit 32 expires, outputs a restart signal, and resumes timer operation once again. The restart signal is input to the PWM circuit 33, but no feedback signal is input thereinto from the error amplifier A. Therefore, the PWM circuit 33 does not provide any PWM signal.

At a time t2, the restart circuit 32 expires once again, outputs a restart signal, and resumes timer operation once again. The restart signal is input to the PWM circuit 33, and a feedback signal is also input thereinto from the error amplifier A. Therefore, the PWM circuit 33 provides a PWM signal. With input of the PWM signal, the driver 34 turns on the switching device Q11. Consequently, the DC/DC converter is enabled once again.

At a time t3, the PWM circuit 33 sets an on-state period according to the magnitude of the feedback signal from the error amplifier A, so that the output of the DC/DC converter is kept constant. When the on-state period expires, the PWM circuit 33 inverts the signal being output. The signal thus inverted causes the driver 34 to turn off the switching device Q11. Consequently, the drain-source voltage of the switching device Q12 decreases, causing the trigger 41 to output a trigger signal. This trigger signal causes the driver 43 to turn on the switching device Q12 through the timer 42.

At a time t4, when the timer 42 expires, the driver 43 turns off the switching device Q12.

The above-described DC/DC converter has the following advantages.

(1) The controller CTL14 detects the turning off of the main switching device Q11 according to a voltage change in the drain-source voltage of the sub-switching device Q12, and keeps the sub-switching device Q12 turned on for a desired period. This means that the sub-switching device Q12 does not turn on as long as the main switching device Q11 is at a stop. Consequently, energy stored in the clamp capacitor C13 is not consumed and, therefore, operation with reduced losses can be achieved.

Furthermore, by ensuring that the sub-switching device Q12 is always brought into action after the main switching device Q11 has already come into action, it is possible to always feed excitation energy, which is produced as the result of the main switching device Q11 being enabled, into the clamp capacitor C13. Consequently, an active clamp action is taken in any sort of operation and, therefore, the withstanding voltage of each circuit element is never exceeded.

(2) The system is based on a self-excitation method wherein trigger signals are derived from the internal operating waveform of the DC/DC converter by means of the triggers 31 and 41. Consequently, there is no need for a circuit for disabling the sub-switching device Q12 when the system is under a light load. Furthermore, the system does not require any dead-time circuit for preventing the switching devices Q11 and Q12 from turning on at the same time.

(3) The controllers CTL13 and CTL14 are grounded at different potentials and operate independently of each other. Consequently, there is no need for any complex level shift circuit or high-voltage circuit, thus simplifying the converter's circuitry. Among other circuit elements, the driver 43 for the switching device Q12 does not require any commonly used high-voltage driver IC or pulse transformer. Consequently, it is possible to configure small-sized, inexpensive converter circuitry.

(4) In cases where the auxiliary winding Nb of the transformer T1 is used, the auxiliary winding can also be used as a winding for supplying power to the controller CTL13. Consequently, it is possible to reduce the size and cost of the DC/DC converter.

(5) The controllers CTL13 and CTL14 are based on a self-excited control method. This means that when an input power supply wherein an AC power supply output is rectified and smoothed is used, the oscillation frequency varies as the rectified and smoothed voltage varies. Consequently, noise is decentralized and therefore the level of electromagnetic interference (EMI) noise is reduced.

Second Embodiment

Figure 17:
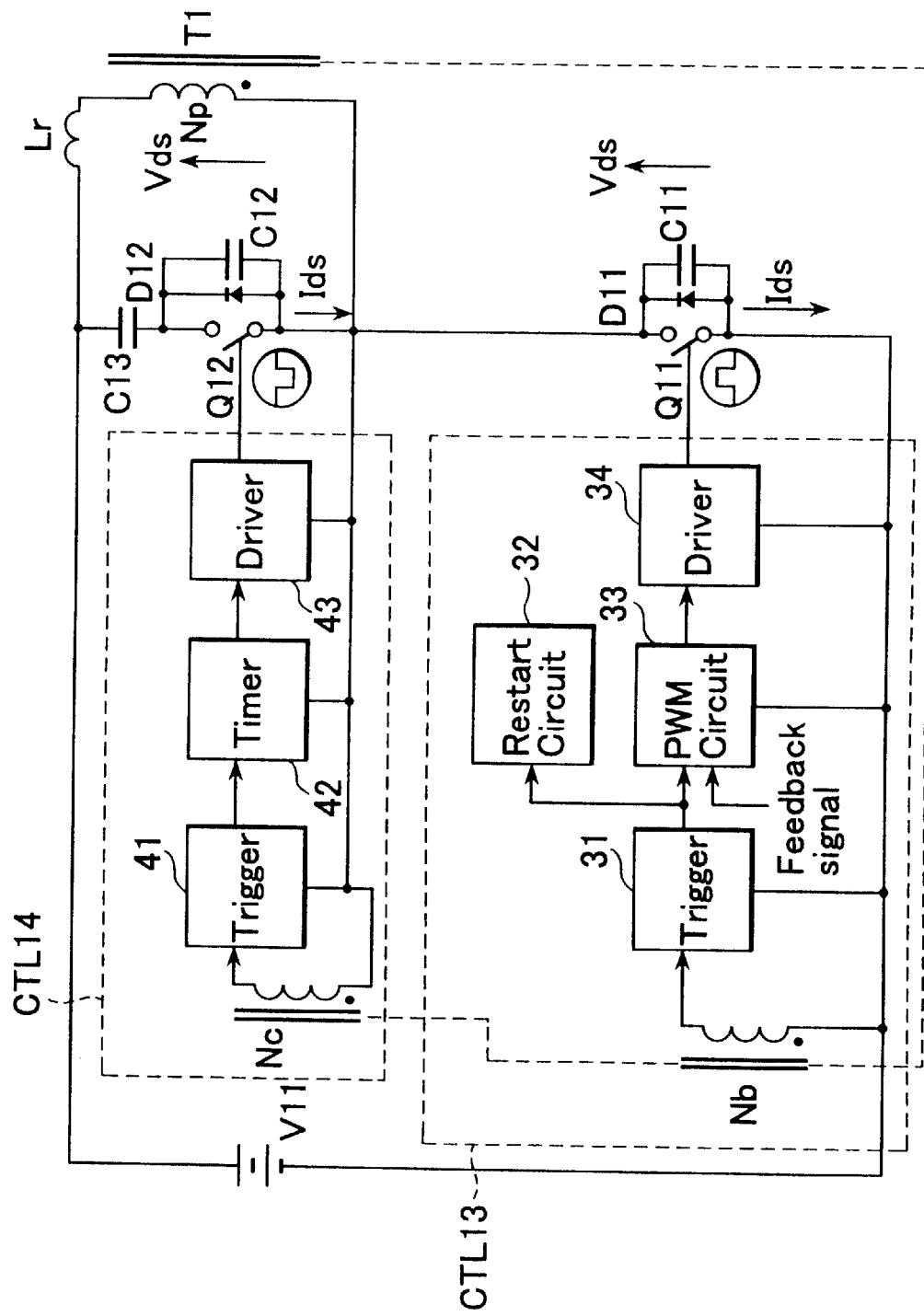
FIG. 17 is a circuit diagram showing a second embodiment of the present invention.

FIG. 17 is a circuit diagram showing a second embodiment of the present invention. Note that elements identical to those shown in FIG. 14 are referenced alike and excluded from the description. In FIG. 17, an auxiliary winding Nc is provided in the transformer T1 in place of the diode D13. One end of the auxiliary winding Nc is grounded to detect a voltage change in the winding Np, and the other end is connected to the input of the trigger 41.

The behavior of the DC/DC converter thus configured is basically the same as that of the system shown in FIG. 14. This DC/DC converter differs from that of FIG. 14 only in that the trigger 41 outputs a trigger signal by means of a voltage change in the winding Np through the auxiliary winding Nc, whereas the trigger outputs a trigger signal by means of a change in the drain-source voltage of the switching device Q12 through the diode D13 in the DC/DC converter of FIG. 14.

Third Embodiment

Figure 18:
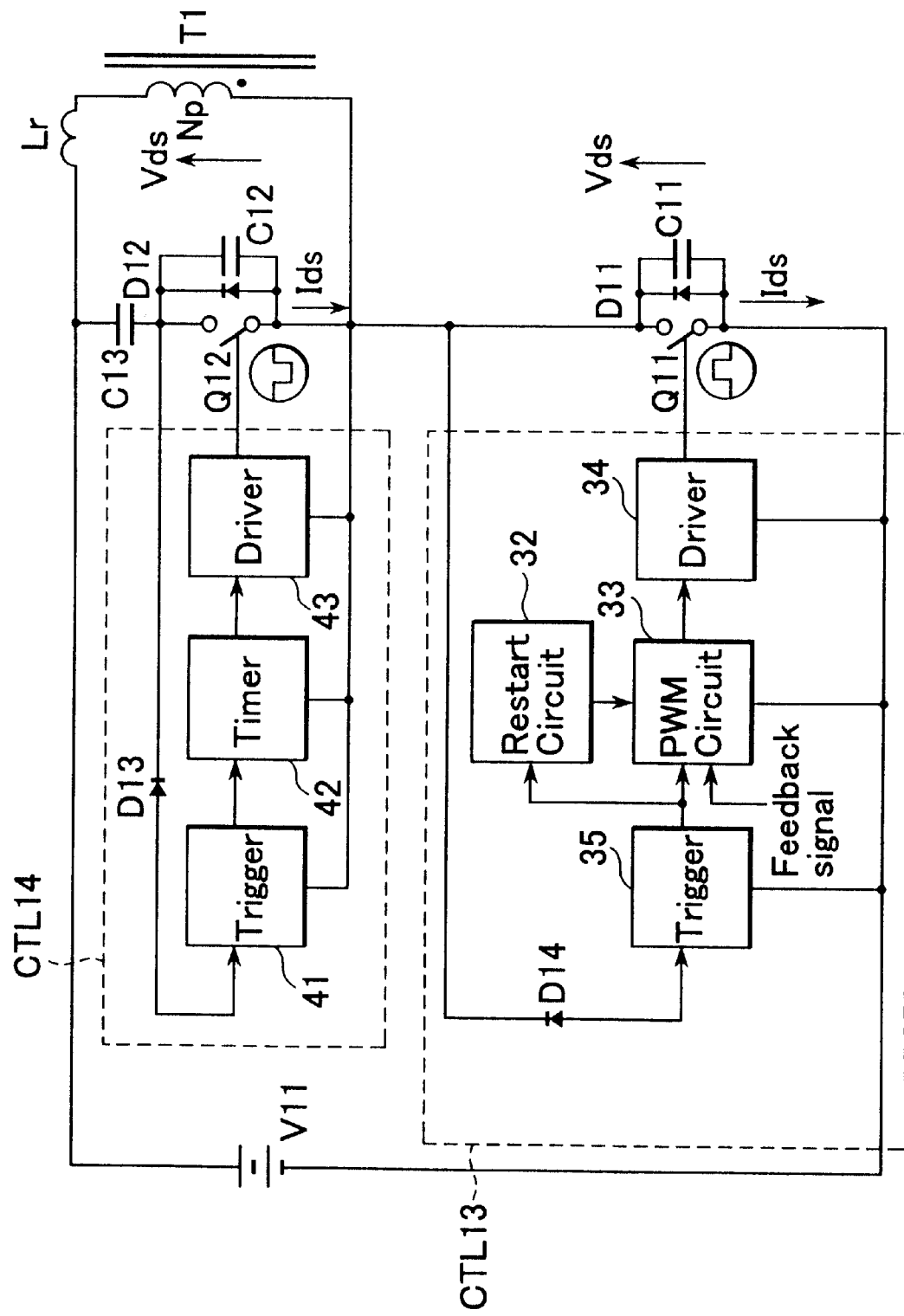
FIG. 18 is a circuit diagram showing a third embodiment of the present invention.

FIG. 18 is a circuit diagram showing a third embodiment of the present invention. Note that elements identical to those shown in FIG. 14 are referenced alike and excluded from the description. In FIG. 18, a diode D14 is provided in place of the auxiliary winding Nb. The cathode of the diode D14 is connected to one end of the switching device Q11. A trigger 35 is provided in place of the trigger 31 and connected to the anode of the diode D14. The trigger 35 outputs a trigger signal to the restart circuit 32 and PWM circuit 33, and is grounded to the negative-voltage side of the DC input power supply V11.

The behavior of the DC/DC converter thus configured is basically the same as that of the DC/DC converter shown in FIG. 14. This DC/DC converter differs from the system of FIG. 14 only in that the trigger 35 outputs a trigger signal by means of a voltage change in the drain-source voltage of the switching device Q11 through the diode D14, whereas the trigger 31 outputs a trigger signal by means of a voltage change in the winding Np in the DC/DC converter of FIG. 14.

Fourth Embodiment

Figure 19:
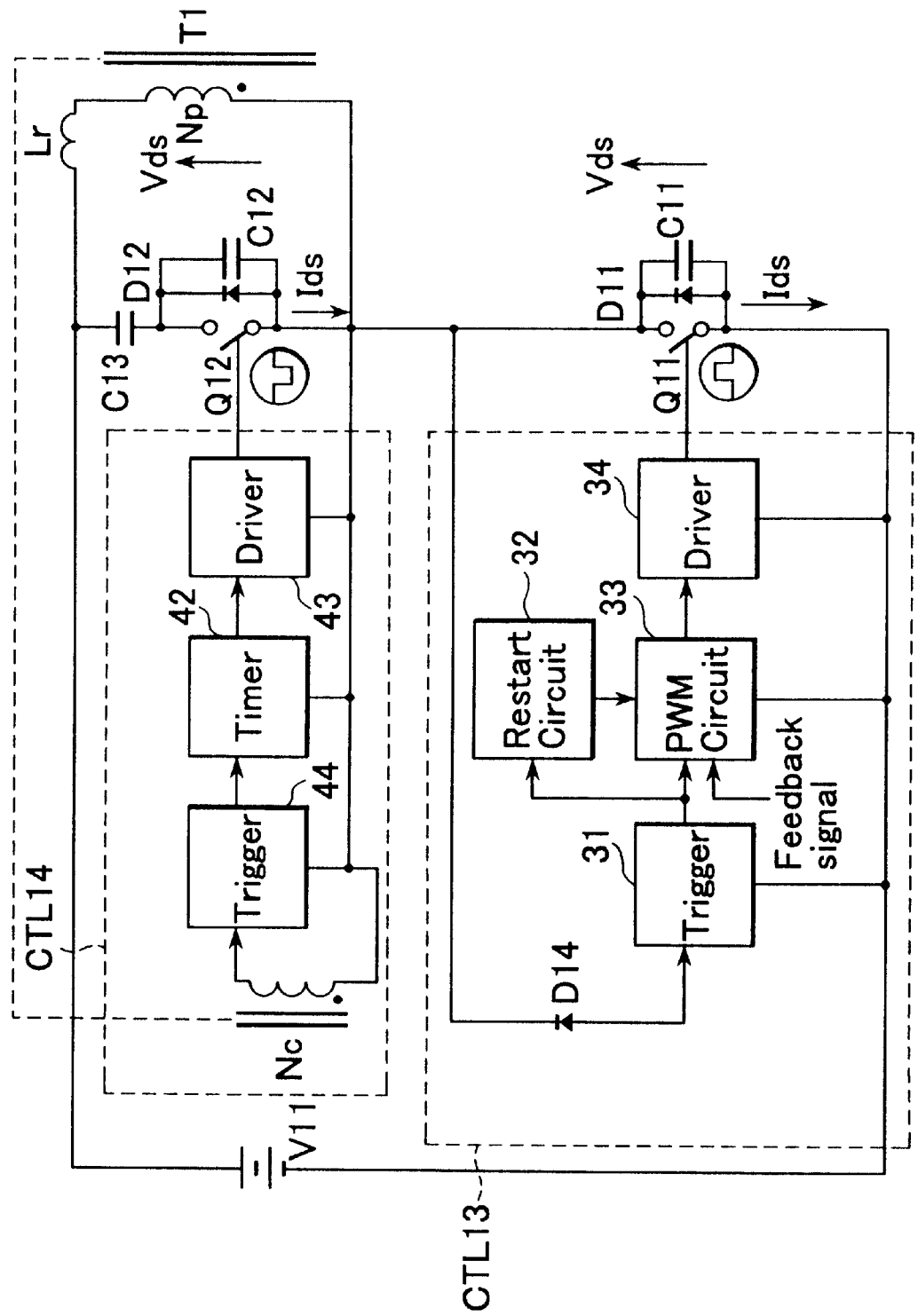
FIG. 19 is a circuit diagram showing a fourth embodiment of the present invention.

FIG. 19 is a circuit diagram showing a fourth embodiment of the present invention. The DC/DC converter of FIG. 19 is the result of combining changes made to the DC/DC converter of FIG. 14 so as to obtain the DC/DC converters of FIGS. 17 and 18. In FIG. 19, an auxiliary winding Nc is provided in the transformer T1 in place of the diode D13. One end of the auxiliary winding Nc is grounded to detect a voltage change in the winding Np, and the other end is connected to the input of the trigger 41. A diode D14 is provided in place of the auxiliary winding Nb. The cathode of the diode D14 is connected to one end of the switching device Q11. A trigger 35 is provided in place of the trigger 31 and connected to the anode of the diode D14. The trigger 35 outputs a trigger signal to the restart circuit 32 and PWM circuit 33, and is grounded to the negative-voltage side of the DC input power supply V11.

Although the DC/DC converter differs in behavior from the DC/DC converter of FIG. 14, the difference is the same as in the case of the DC/DC converters shown in FIGS. 17 and 18, and therefore will not be explained here.

Fifth Embodiment

Figure 20:
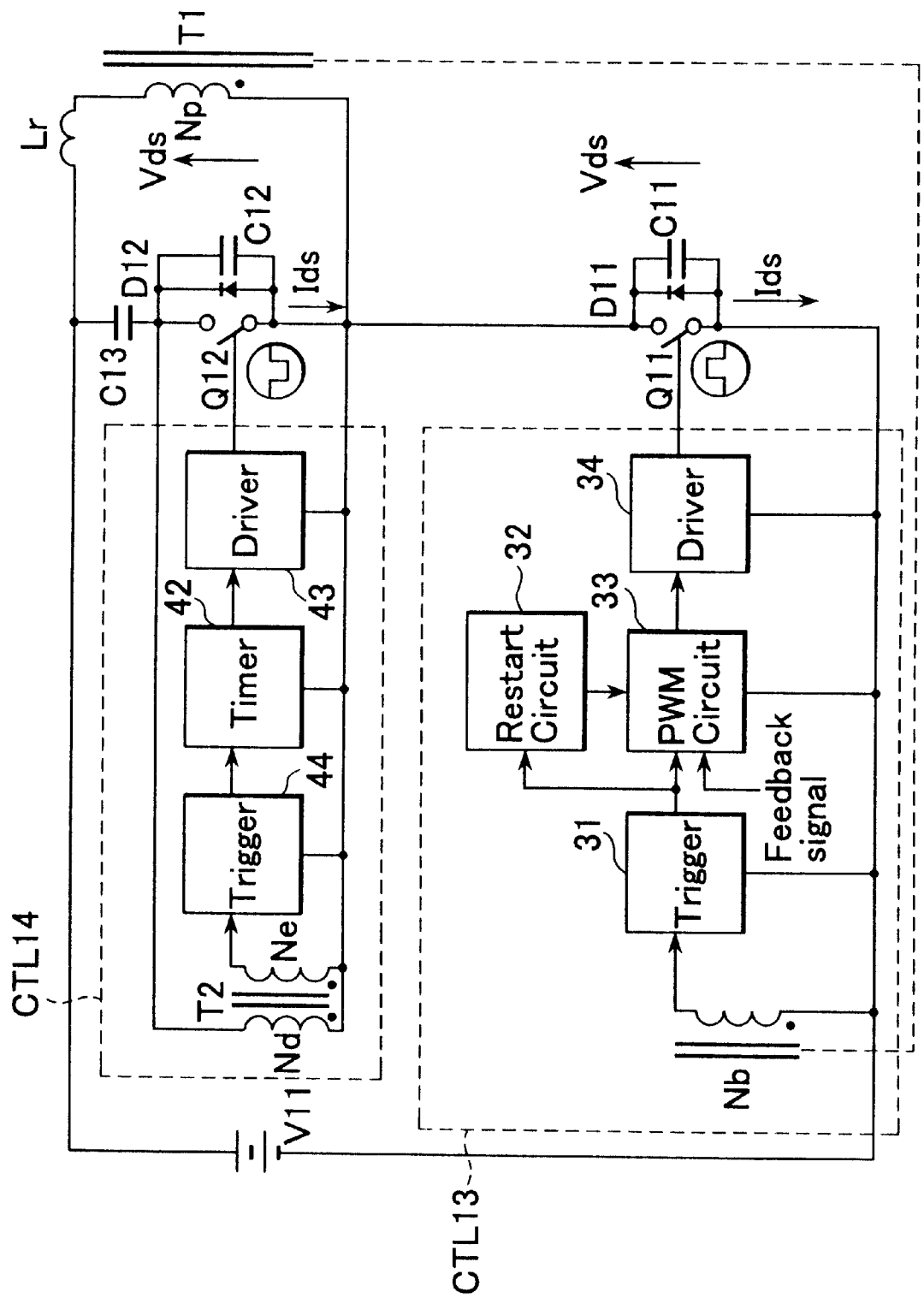
FIG. 20 is a circuit diagram showing a fifth embodiment of the present invention.

FIG. 20 is a circuit diagram showing a fifth embodiment of the present invention. Note that elements identical to those shown in FIG. 14 are referenced alike and excluded from the description. In FIG. 20, an auxiliary transformer T2 is equipped with windings Nd and Ne in place of the diode D13, detects a voltage change in the primary winding Np, and provides isolation. One end of the winding Nd is connected to one end of the switching device Q12 and the other end is connected to the other end of the switching device Q12. One end of the winding Ne is connected to the other end of the switching device Q12. A trigger 44 is provided in place of the trigger 41 and connected to the other end of the winding Ne, and outputs a trigger signal to a timer 42. The trigger 44 is grounded to the other end of the switching device Q12.

The behavior of the DC/DC converter thus configured is basically the same as that of the DC/DC converter shown in FIG. 14. This DC/DC converter differs from that of FIG. 14 only in that the trigger 44 outputs a trigger signal by means of a voltage change in the drain-source voltage of the switching device Q12 through the auxiliary transformer T2.

It should be noted that the present invention is in no way limited to the first to fifth embodiments. The polarities of the windings Nb, Nc, Nd and Ne may be such as can be handled more easily by triggers.

Although reference is made to a DC/DC converter configured using the diodes D13 and D14, changes in the drain-source voltages of the switching device Q11 and Q12 may be detected within the triggers 35 and 41 without the need for the diodes D13 and D14.

Furthermore, the DC/DC converter may be configured using the controller CTL11 shown in FIG. 2 in place of the controller CTL13. More particularly, the DC/DC converter may be configured so that the controller CTL14 turns off the sub-switching device Q12 under a light load.

Furthermore, the controller CTL13 may be configured using an auxiliary transformer in place of the winding Nb. It is also possible for the auxiliary transformer T2 to use a potential at one end of the switching device Q11 or at one end of the primary winding Np, as long as a voltage change in the primary winding Np can be detected. Note that when a potential at one end of the switching device Q11 is used, the other end of the winding Nd is connected to the other end of the switching device Q11.

Although further reference is made to a DC/DC converter configured using the auxiliary windings Nb and Nc and the auxiliary transformer T2 within the controllers CTL13 and CTL14, the windings and transformer may be provided outside the controllers.

Although a MOSFET is shown as the switching device, capacitors and diodes may be added if a regular switch is used instead of the switching device.

Sixth Embodiment

Figure 5:
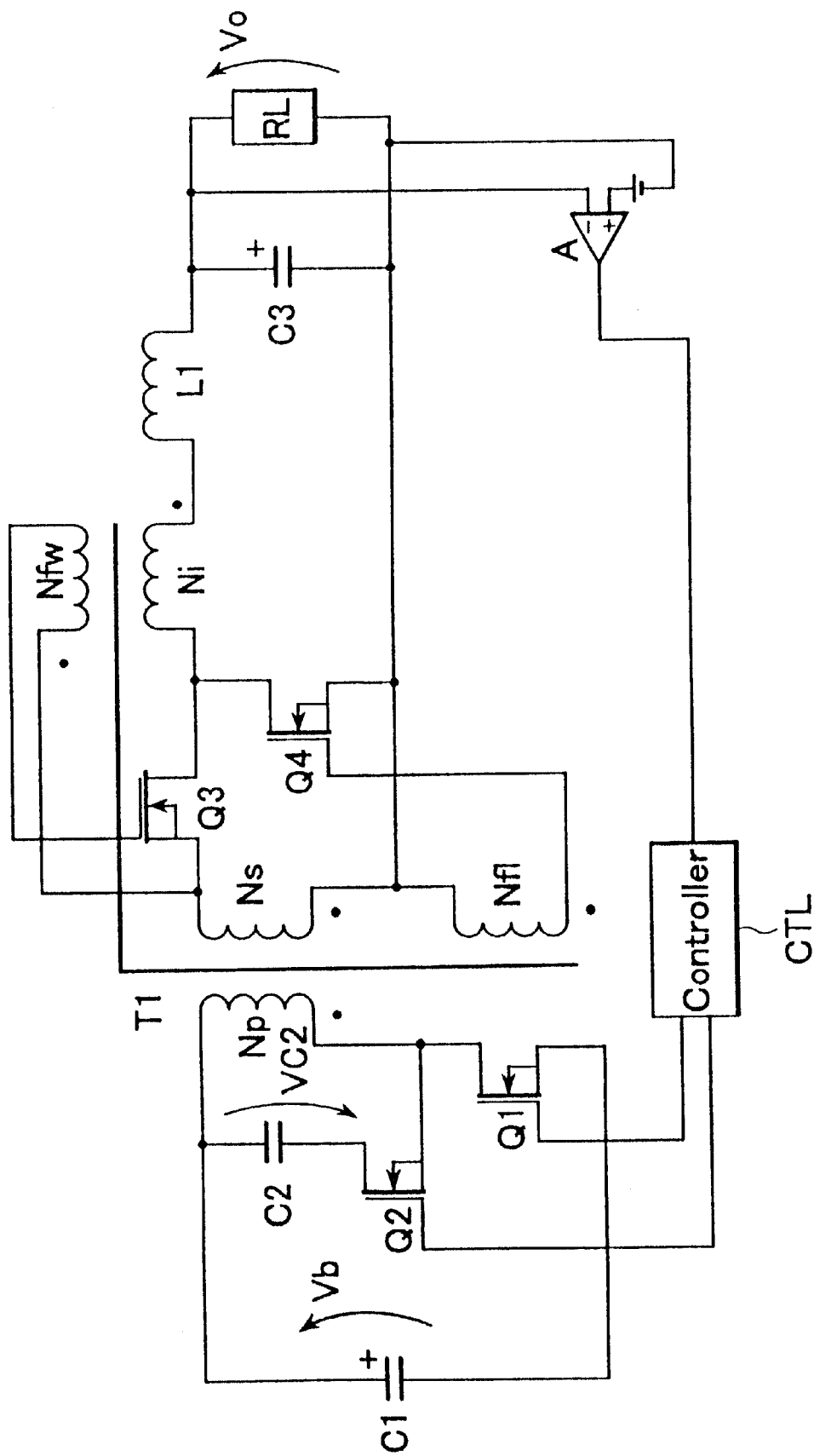
FIG. 5 is the circuit diagram of a second example of the prior art DC/DC converter.
Figure 21:
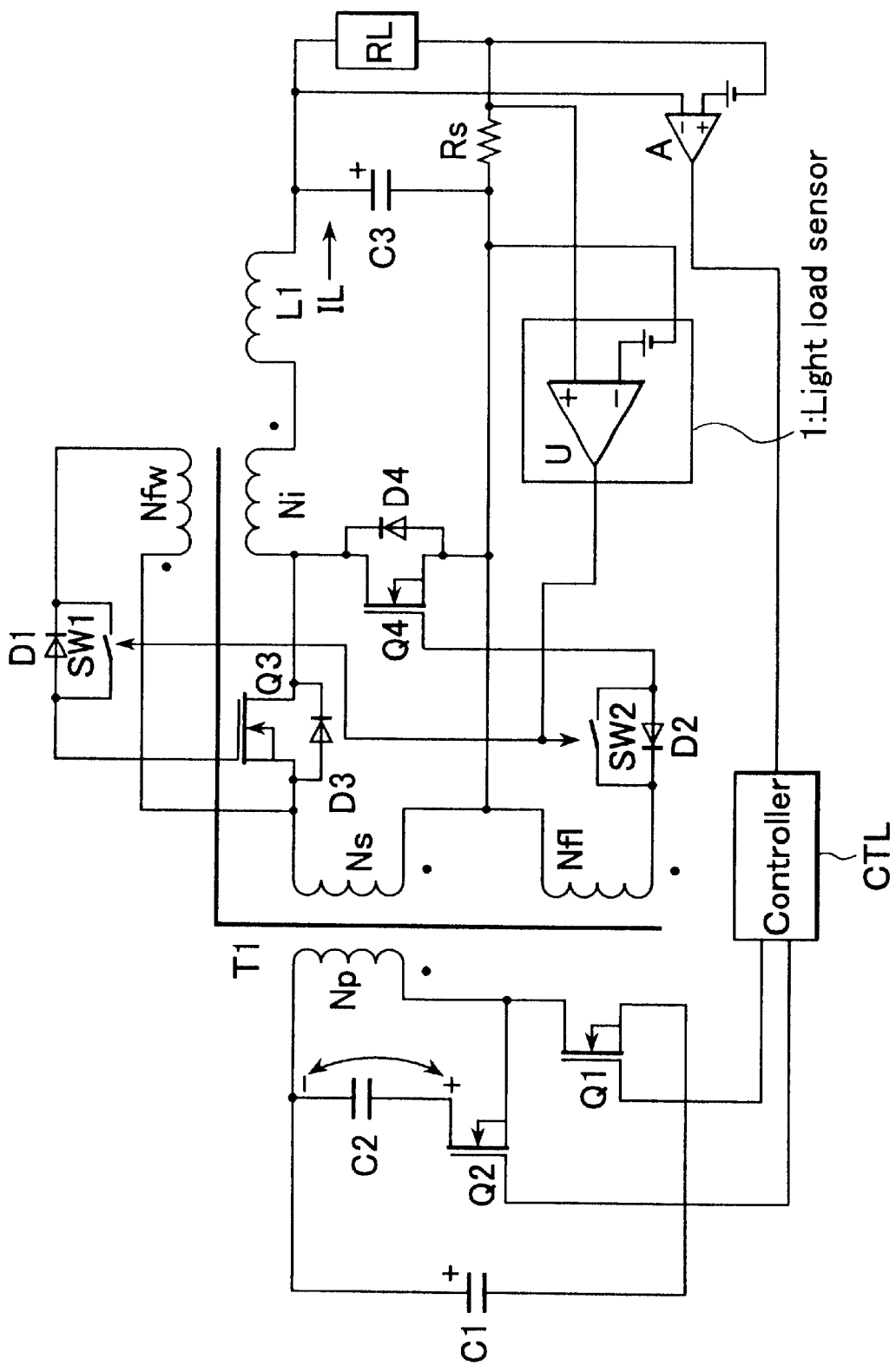
FIG. 21 is a circuit diagram showing a sixth embodiment of the present invention.

FIG. 21 is a circuit diagram showing a sixth embodiment of the present invention. Note that elements identical to those shown in FIG. 5 are referenced alike and excluded from the description.

In FIG. 21, symbols D1 to D4 denote diodes, symbols SW1 and SW2 denote third and fourth switches, a symbol Rs denotes a current-sensing resistor, and a numeral 1 denotes a light load sensor.

The anode of the diode D1 is connected to the gate of the MOSFET Q3 and the cathode is connected to the other end of the Nfw. The anode of the diode D2 is connected to the gate of the MOSFET Q4 and the cathode is connected to the other end of the Nfl. The anodes of the diodes D3 and D4 are connected to the sources of the MOSFETs Q3 and Q4, respectively, and the cathodes are connected to the drains of the MOSFETs Q3 and Q4, respectively. The switches SW1 and SW2 are parallel-connected to the diodes D1 and D2, respectively.

The current-sensing resistor Rs is provided between the other ends of the capacitor C3 and load circuit RL. The light load sensor 1 is composed of a comparator U. The positive terminal of the comparator U is connected to the other end of the load circuit RL and the negative terminal is connected to the other end of the capacitor C1 through a voltage reference. The comparator U turns on the switches SW1 and SW2 when the output of the comparator is high, and turns off the switches when the output is low.

Figure 6:
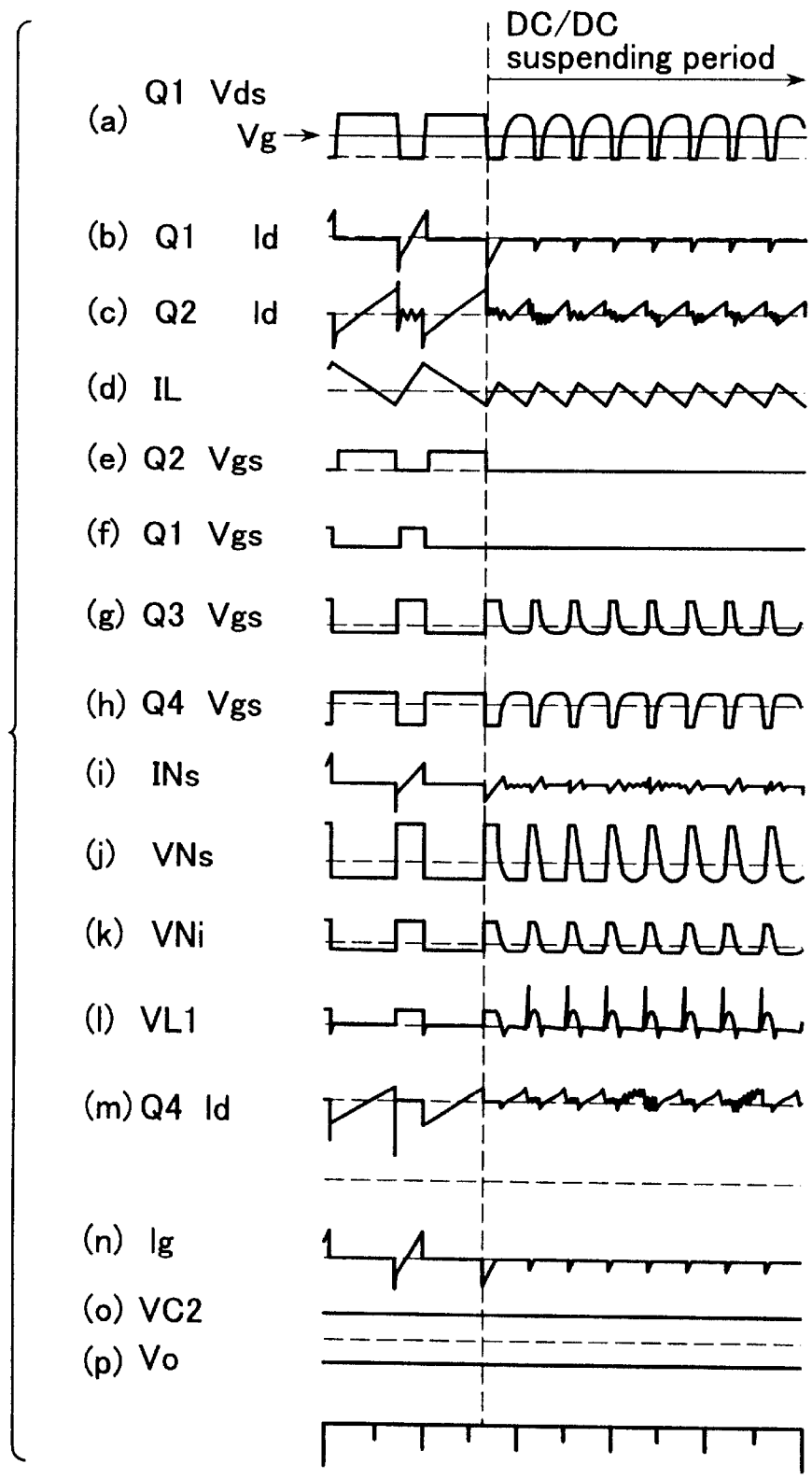
FIG. 6 is a timing chart showing the behavior of the DC/DC converter of FIG. 5.
Figure 7:
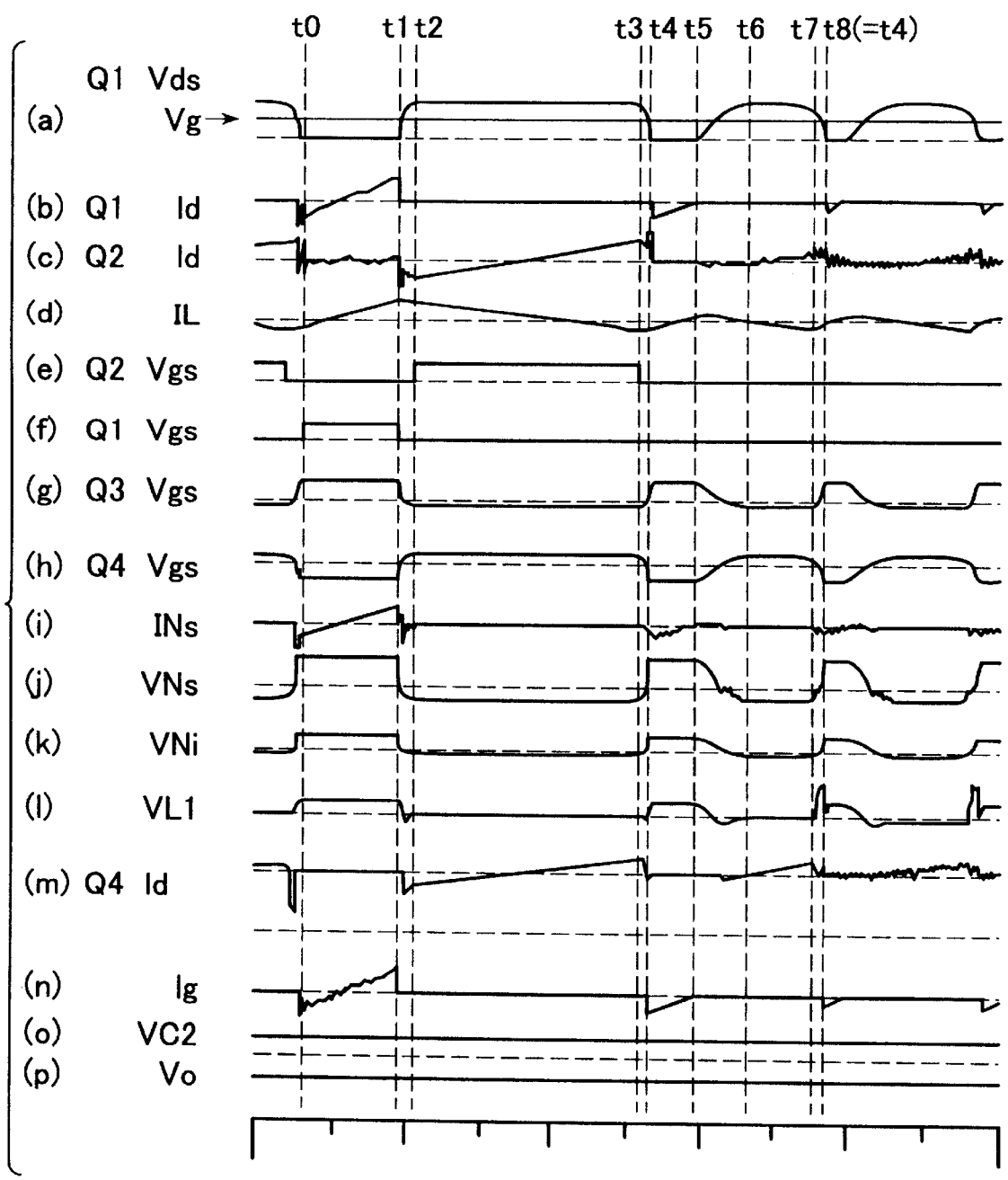
FIG. 7 is an enlarged view of FIG. 6.
Figure 8:
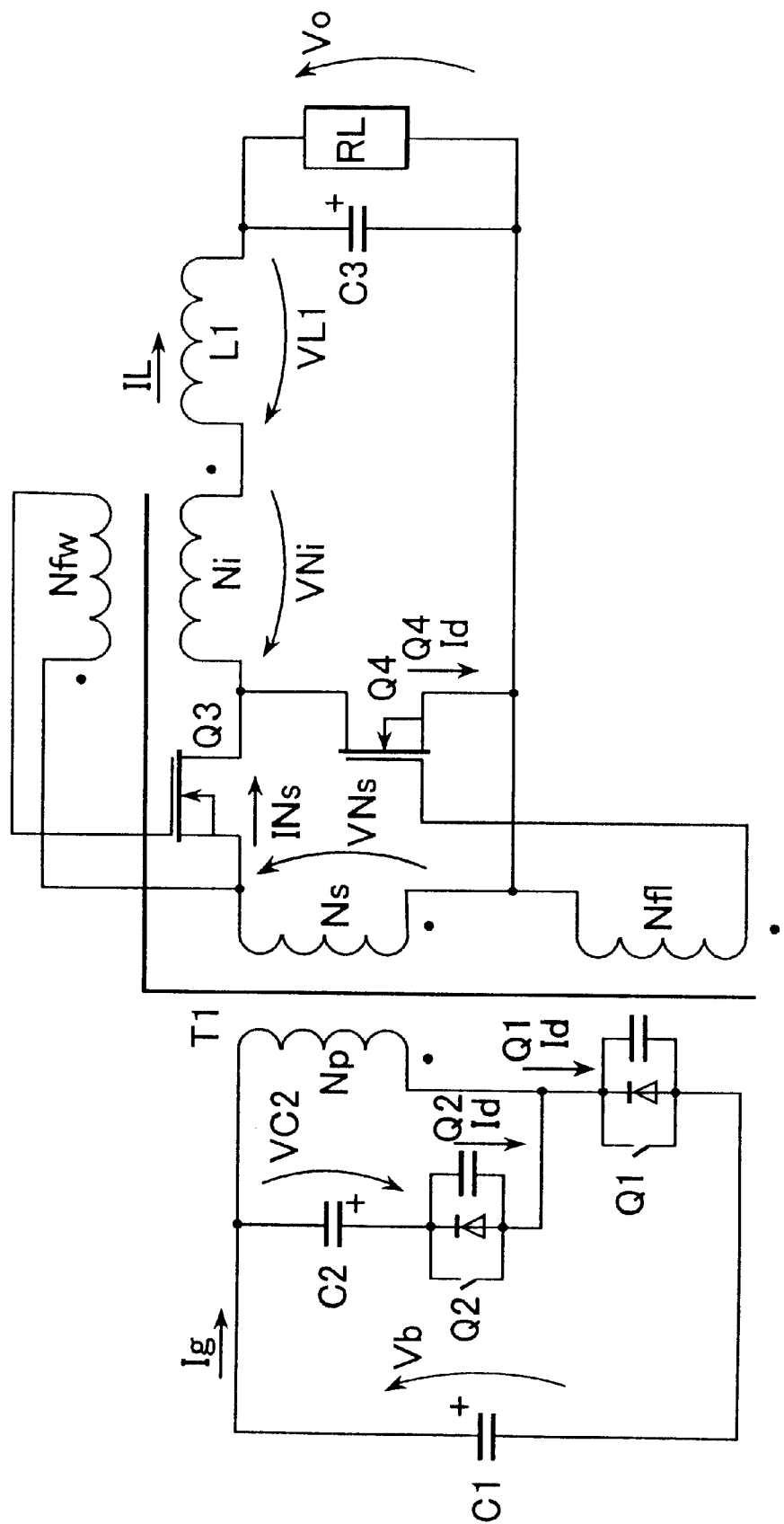
FIG. 8 is a circuit diagram explaining the behavior of the DC/DC converter of FIG. 5.
Figure 9:
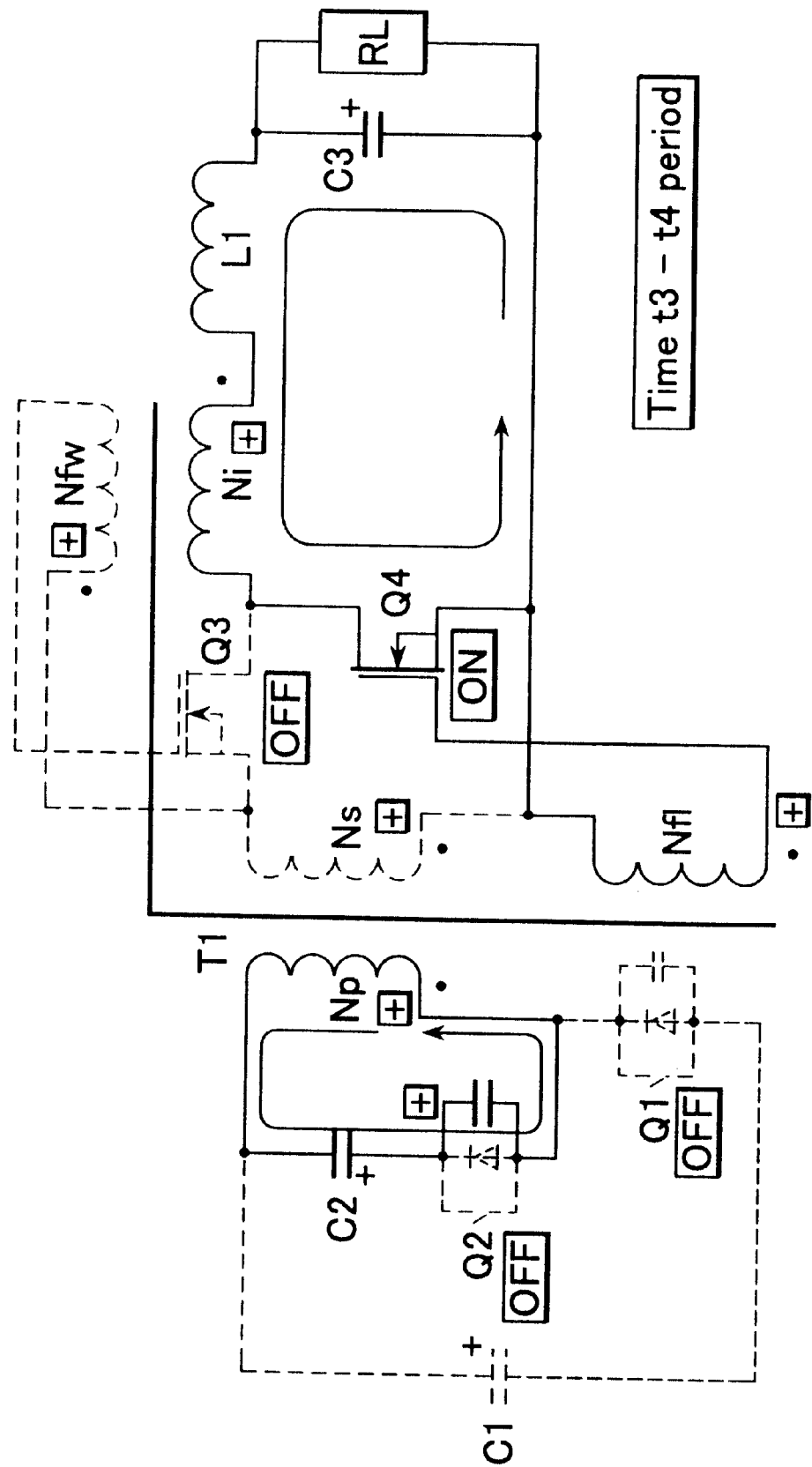
FIG. 9 is another circuit diagram explaining the behavior of the DC/DC converter of FIG. 5.
Figure 10:
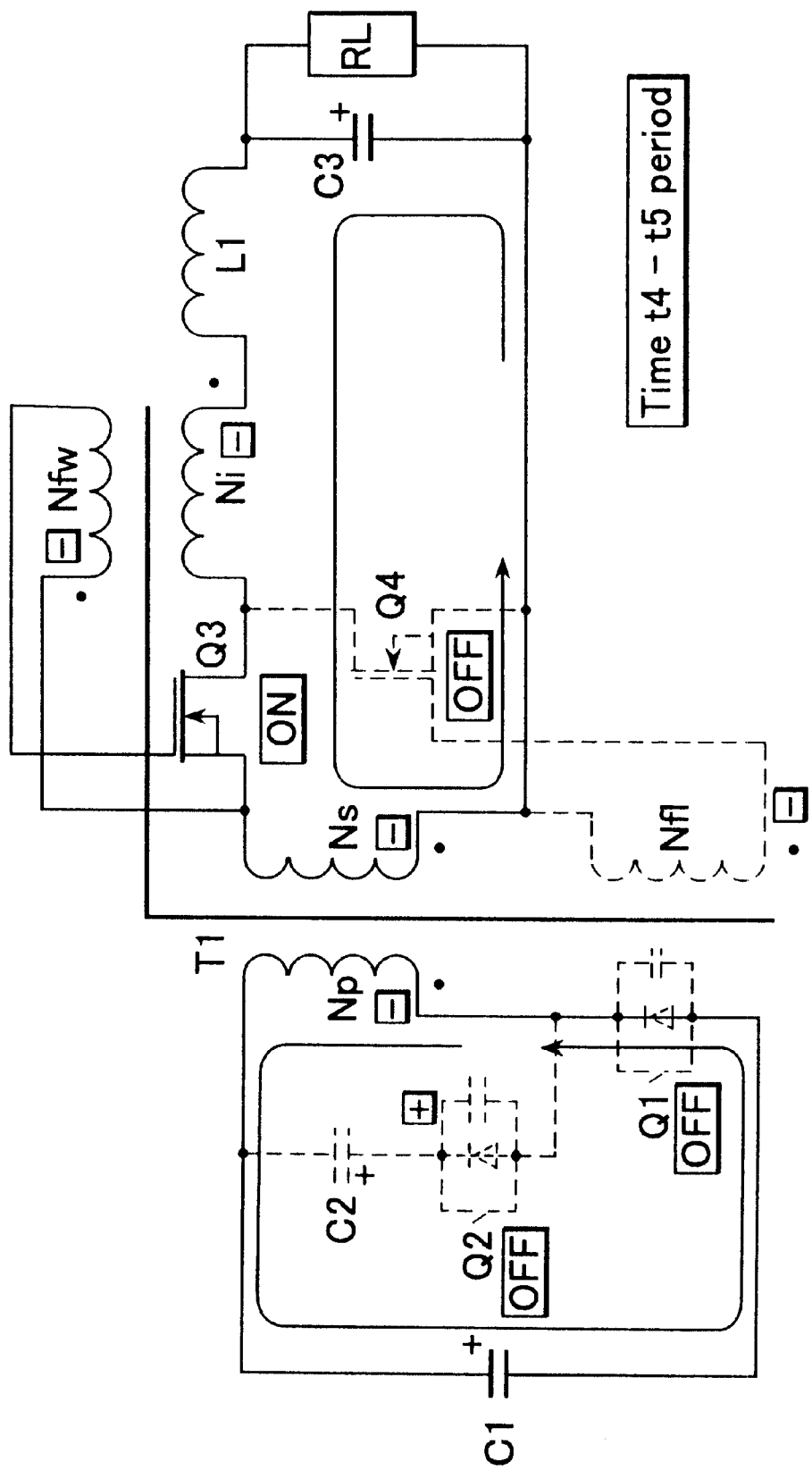
FIG. 10 is yet another circuit diagram explaining the behavior of the DC/DC converter of FIG. 5.
Figure 11:
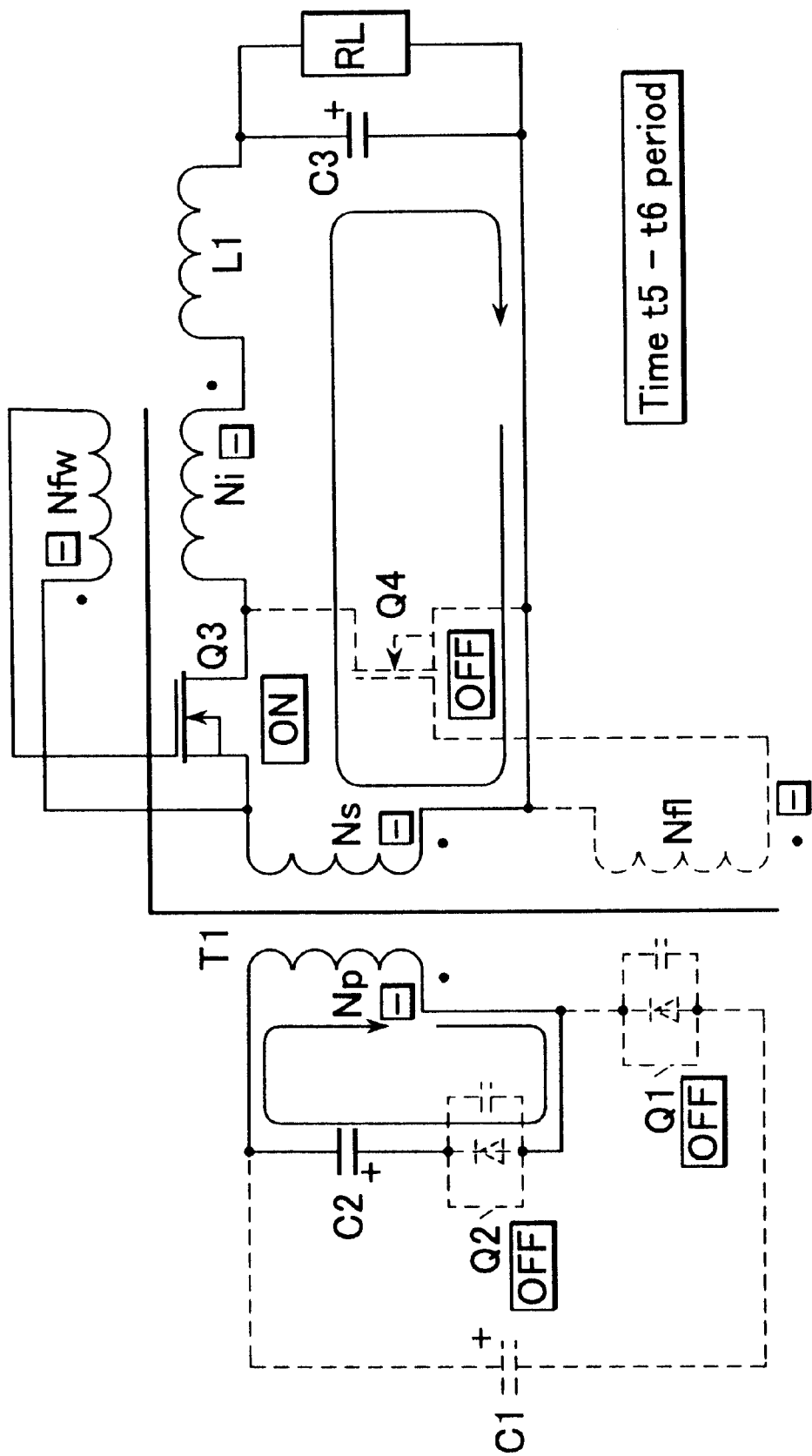
FIG. 11 is yet another circuit diagram explaining the behavior of the DC/DC converter of FIG. 5.
Figure 12:
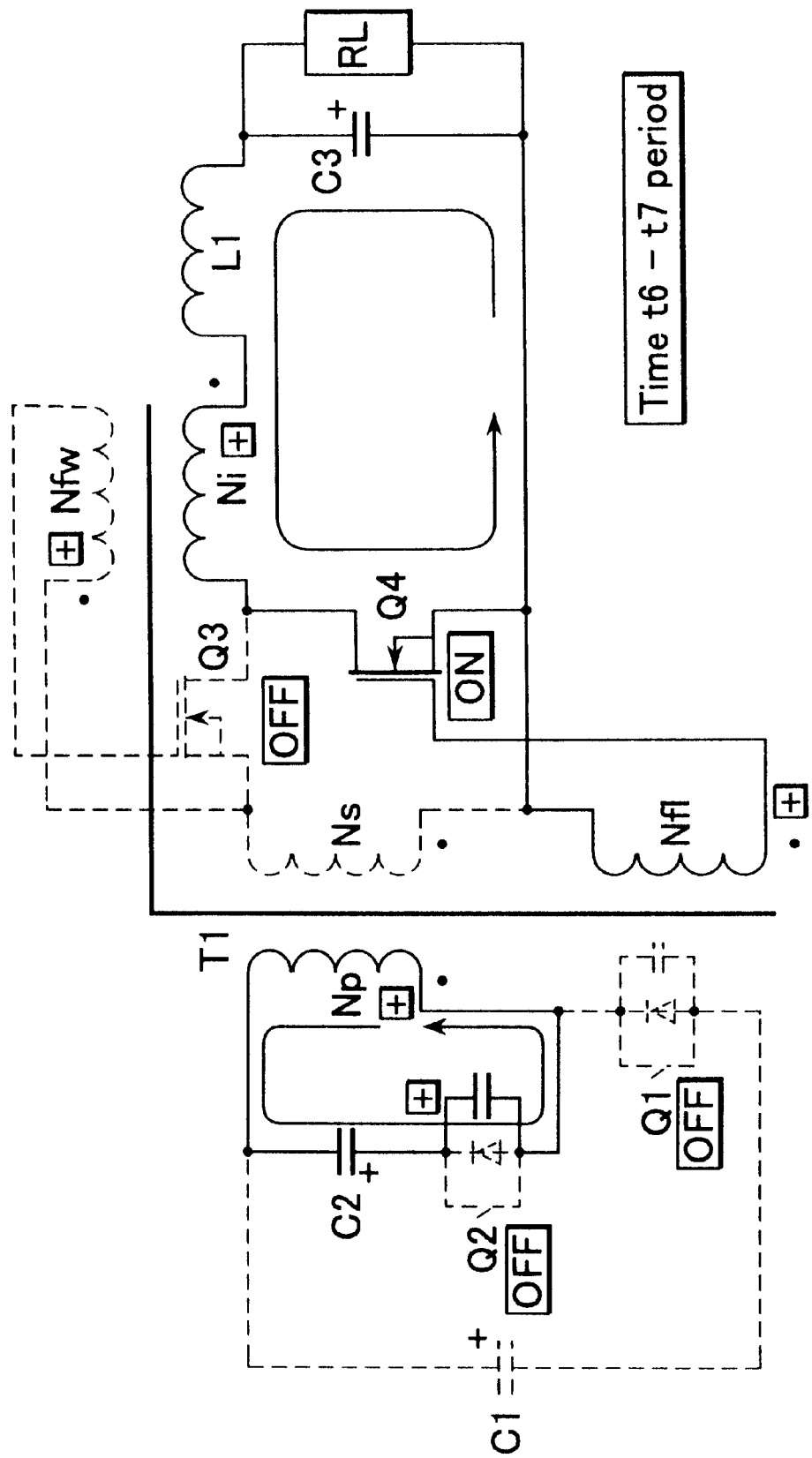
FIG. 12 is yet another circuit diagram explaining the behavior of the DC/DC converter of FIG. 5.
Figure 13:
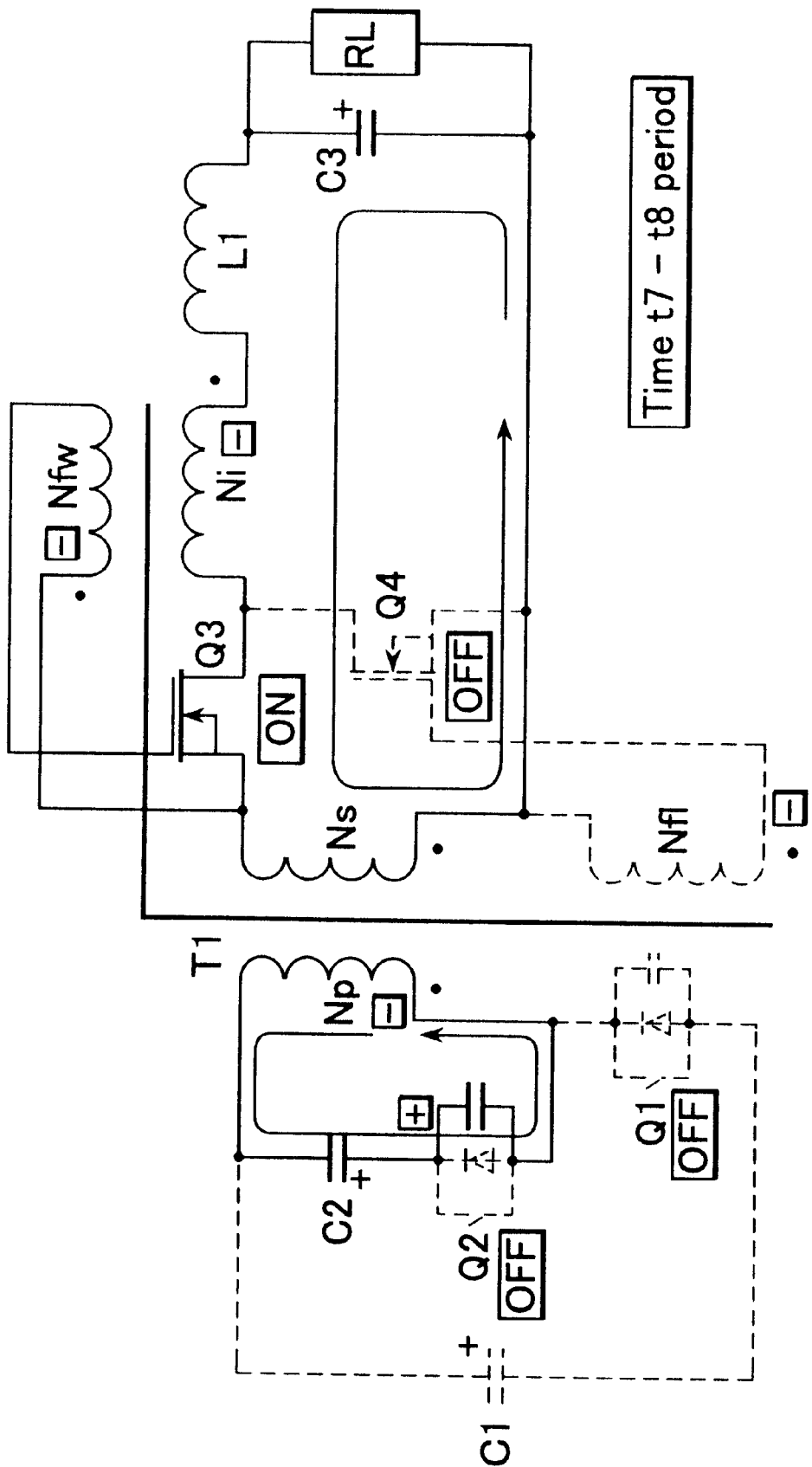
FIG. 13 is yet another circuit diagram explaining the behavior of the DC/DC converter of FIG. 5.
Figure 22:
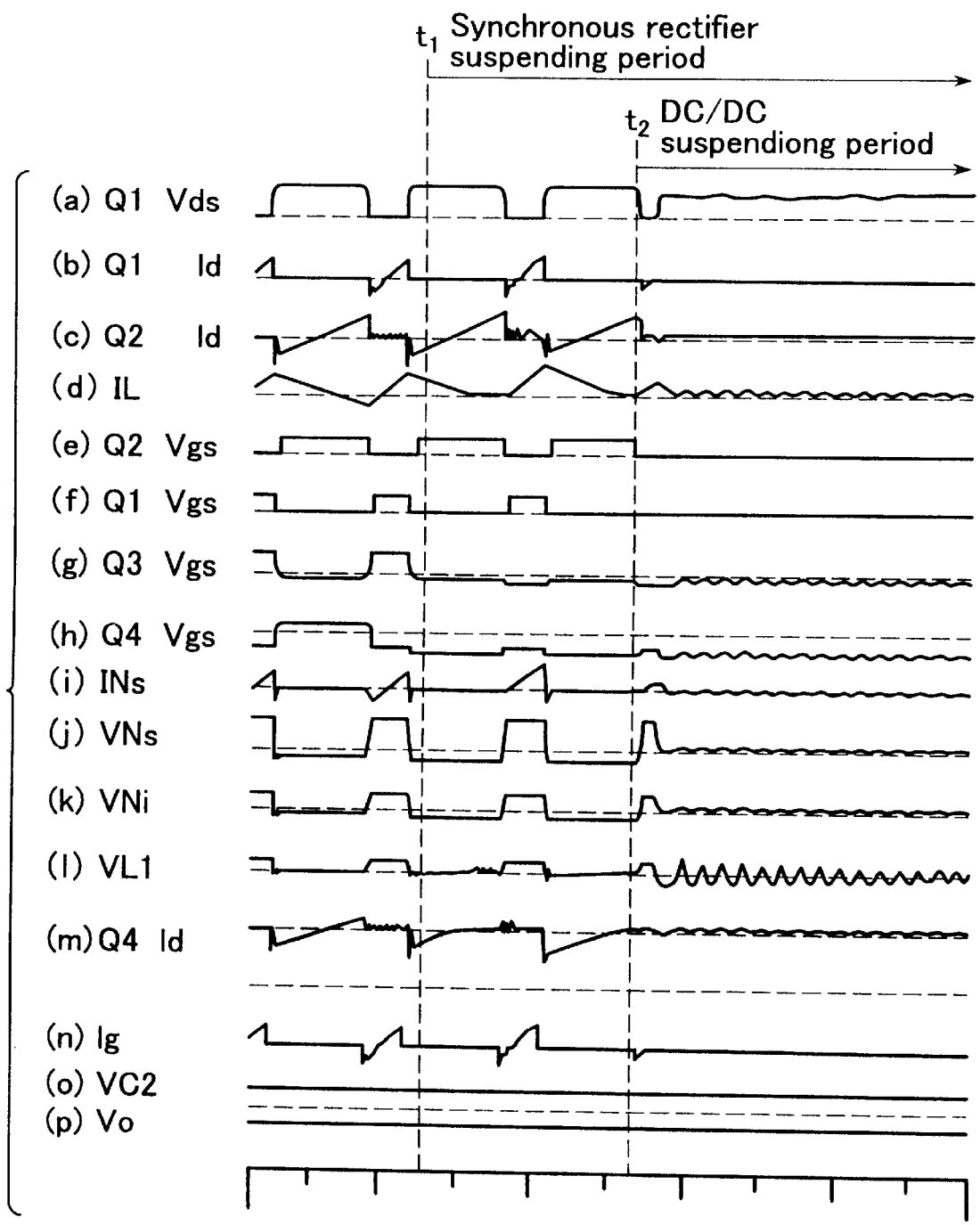
FIG. 22 is a timing chart showing the behavior of the DC/DC converter of FIG. 21.

Now, the behavior of such a DC/DC converter as explained above is described. FIG. 22 is a timing chart showing the behavior of the DC/DC converter of FIG. 21. Note that symbols (a) to (p) denote the same signals as those denoted in FIGS. 6 and 7.

At a time t1, the output current decreases as the load reduces and, therefore, the voltage developed across the current-sensing resistor Rs also decreases. Consequently, the light load sensor 1 (comparator U) is at a level lower than the level of the voltage reference, thus outputting a low-state signal. Accordingly, the switches SW1 and SW2 turn off, thereby isolating the windings Nfw and Nfl from the MOSFETs Q3 and Q4.

At this point, the windings Nfw and Nfl are isolated irrespective of the timings with which the MOSFETs Q1 and Q2 are controlled, i.e., irrespective of a transition toward a light-load state. For this reason, electricity built up in the gates of the MOSFETs Q3 and Q4 is not discharged since the switches SW1 and SW2 are off, if such voltages as to turn on the MOSFETs Q3 and Q4 are present at the windings Nfw and Nfl. This means that the MOSFETs Q3 and Q4 remain on, short-circuiting the secondary circuitry. To avoid this problem, the electricity accumulated in the gates of the MOSFETs Q3 and Q4 is discharged by means of the diodes D1 and D2 so that the MOSFETs are turned off.

Synchronous rectification is maintained by the body diodes of the MOSFETs Q3 and Q4 and the diodes D3 and D4.

At a time t2, the error amplifier A outputs a low-state signal, whereby the controller CTL judges the DC/DC converter to be in a light-load state and turns off the MOSFETs Q1 and Q2. However, since the MOSFETs Q3 and Q4 have been turned off already by the switches SW1 and SW2, resonance no longer continues.

As described heretofore, the light load sensor 1 detects the light-load state, turns off the switches SW1 and SW2 that form a rectifying circuit, and thereby disables the MOSFETs Q3 and Q4. Consequently, it is possible to prevent the MOSFETs Q3 and Q4 from malfunctioning because of resonance produced in the primary circuitry when the DC/DC converter is at a stop. In other words, it is possible to prevent the DC/DC converter from supplying energy necessary for the resonance from the secondary circuitry to the primary circuitry. This means that losses at a light load can be avoided.

Although the embodiment shows a case where the diodes D3 and D4 are provided, the DC/DC converter may be configured without using the diodes D3 and D4 since rectification is carried out by the body diodes of the MOSFETs Q3 and Q4.

It is no substantial problem if the body diodes of the MOSFETs Q3 and Q4 are inferior to regular rectifying diodes in terms of losses, since the DC/DC converter is under a light load.

Seventh Embodiment

Now, a seventh embodiment of the present invention will be described by referring to FIG. 23. Note that elements identical to those shown in FIG. 21 are referenced alike and excluded from the description.

Figure 23:
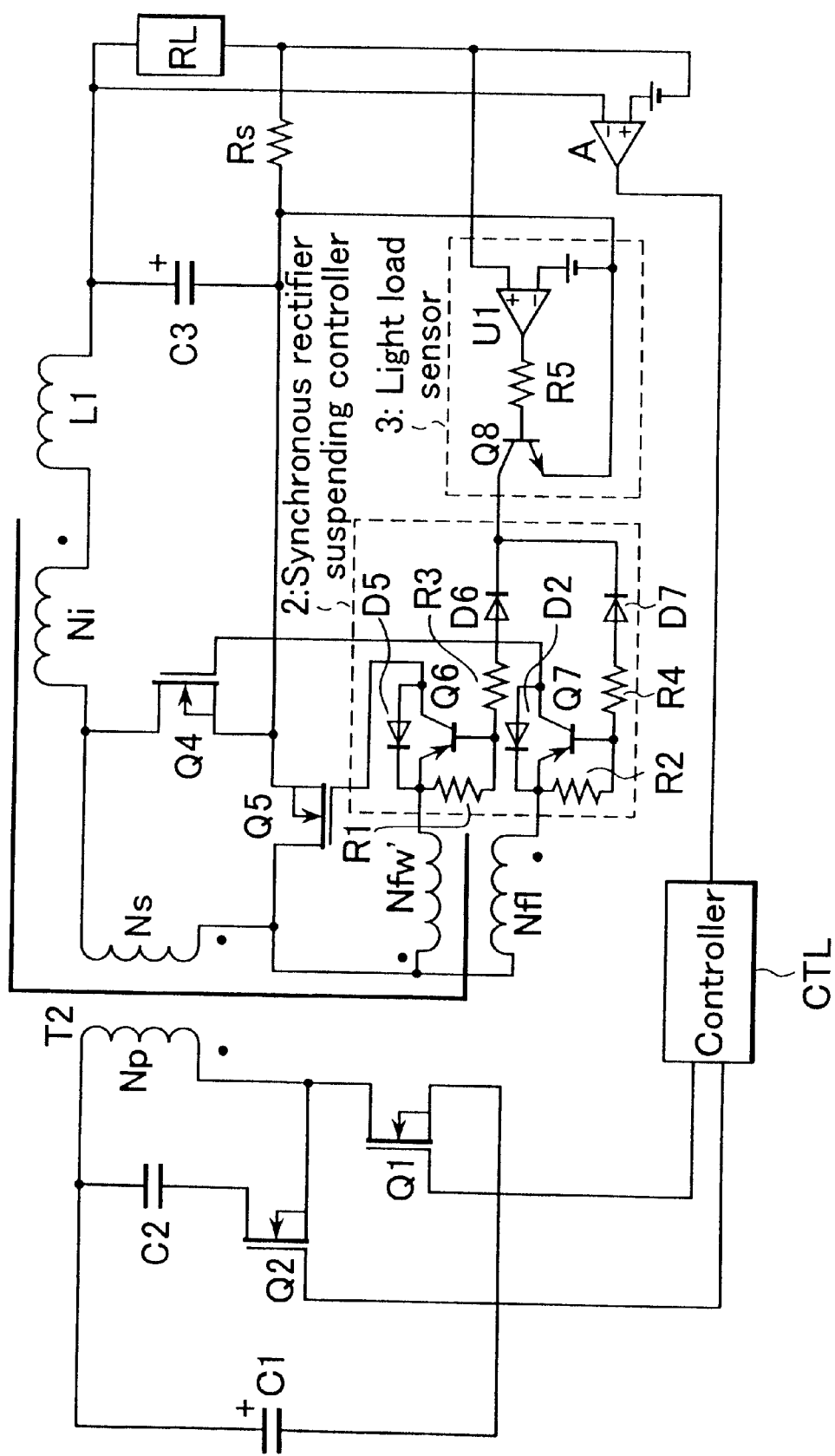
FIG. 23 is a circuit diagram showing a seventh embodiment of the present invention.

In FIG. 23, a symbol Nfw' denotes a drive winding, a symbol Q5 denotes an n-type MOSFET, symbols Q6 and Q7 denote PNP transistors, a symbol Q8 denotes an NPN transistor, symbols R1 to R5 denote resistors, symbols D5 to D7 denote diodes, and a symbol U1 denotes a comparator.

The windings Np, Ns, Nfw' Nfl and Ni form a transformer T2, and the MOSFETs Q4 and Q5 form a rectifying circuit. The transistors Q6 and Q7, resistors R1 to R4, and diodes D2 and D5 to D7 form a synchronous rectifier suspending controller 2, and the transistor Q8, resistor R5, and comparator U1 form a light load sensor 3.

The MOSFET Q5 is provided in place of the MOSFET Q3. The drain of the MOSFET Q5 is connected to the other end of the winding Ns and the source is connected to the source of the MOSFET Q4. The winding Nfw' is provided in place of the winding Nfw. One end of the winding Nfw' is connected to the other end of the winding Ns, and the other end is connected to the emitter of the MOSFET Q6.

The collector of the transistor Q6 is connected to the gate of the MOSFET Q5. The resistor R1 is provided between the emitter and base of the transistor Q6. The anode of the diode D5 is connected to the collector of the transistor Q6, and the cathode is connected to the emitter thereof.

The transistor Q7 is provided in place of the switch SW2. The collector of the transistor Q7 is connected to the anode of the diode D2 and the emitter is connected to the cathode thereof. The resistor R2 is provided between the emitter and base of the transistor Q7.

One end each of the resistors R3 and R4 is connected to the base of each of the transistors Q6 and Q7. The anodes of the diodes D6 and D7 are connected to the other ends of the resistors R3 and R4, respectively.

The collector of the transistor Q8 is connected to the cathodes of the diodes D6 and D7, and the emitter is connected to the other end of the capacitor C3. One end of the resistor R5 is connected to the base of the transistor Q8. The output of the comparator U1 is connected to the other end of the resistor R5, the positive terminal of the comparator U1 is connected to the other end of the load circuit RL, and the negative terminal is connected to the other end of the capacitor C3 through the voltage reference.

In the DC/DC converter described above, the MOSFET Q5 is provided in place of the MOSFET Q3 and thus the winding Nfw is replaced with the winding Nfw' This embodiment shows a case where the third and fourth switches SW1 and SW2 are specifically composed of the transistors Q6 and Q7 and a light-load sensing unit is specifically composed of the light load sensor 3. Therefore, the behavior of the DC/DC converter is the same as that of the DC/DC converter of FIG. 21, and will not be explained here.

Eighth Embodiment

Now, an eighth embodiment of the present invention will be described by referring to FIG. 24. Note that elements identical to those shown in FIG. 23 are referenced alike and excluded from the description.

Figure 24:
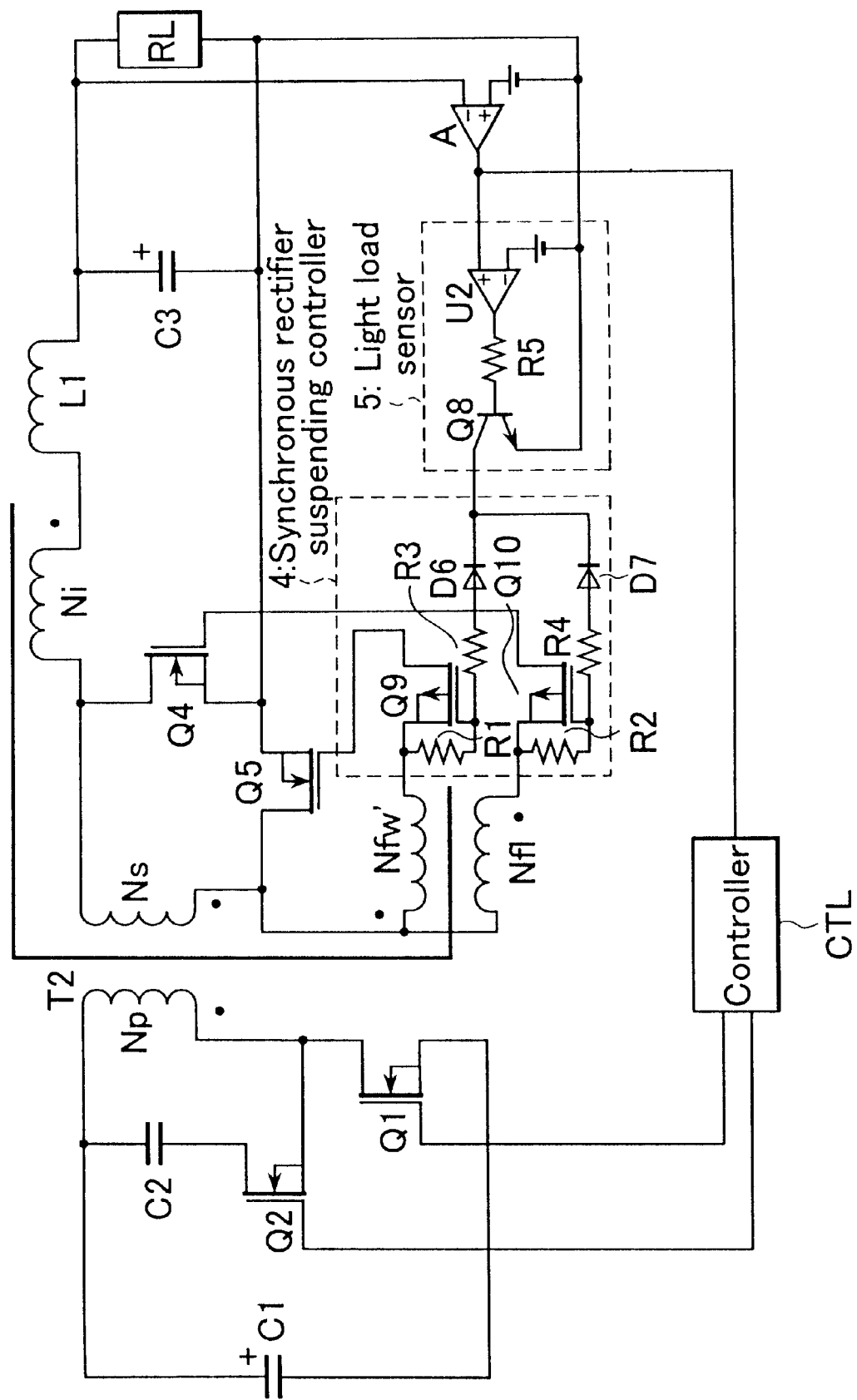
FIG. 24 is a circuit diagram showing an eighth embodiment of the present invention.

In FIG. 24, symbols Q9 and Q10 denote p-type MOSFETs and a symbol U2 denotes a comparator. The transistors Q9 and Q10, resistors R1 to R4, and diodes D6 and D7 form a synchronous rectifier suspending controller 4, and the transistor Q8, resistor R5, and comparator U2 form a light load sensor 5.

The MOSFET Q9 is provided in place of the transistor Q6 and diode D5. The source of the MOSFET Q9 is connected to the other end of the winding Nfw' the drain is connected to the gate of the MOSFET Q5, and the gate is connected to one end of the resistor R3.

The MOSFET Q10 is provided in place of the transistor Q7 and diode D2. The source of the MOSFET Q10 is connected to the other end of the winding Nfl, the drain is connected to the gate of the MOSFET Q4, and the gate is connected to the other end of the resistor R4.

The comparator U2 is provided in place of the resistor Rs and comparator U1. The output of the comparator U2 is connected to the other end of the resistor R5, the positive terminal of the comparator U1 is connected to the other end of the load circuit RL and the output of the error amplifier A, and the negative terminal is connected to the other end of the load circuit RL through the voltage reference.

In the DC/DC converter described above, the third and fourth switches are specifically composed of the MOSFETs Q9 and Q10, and the diodes D2 and D5 are no longer necessary since the body diodes of the MOSFETs Q3 and Q4 serve their purposes. Furthermore, since the output voltage of the error amplifier A is proportional to the output power of the DC/DC converter, the output voltage is used as the sensing point of the light load sensor 5. Therefore, the behavior of the DC/DC converter is the same as that of the DC/DC converter of FIG. 21, and will not be explained here.

Ninth Embodiment

Now, a ninth embodiment of the present invention will be described by referring to FIG. 25. Note that elements identical to those shown in FIGS. 23 and 24 are referenced alike and excluded from the description.

Figure 25:
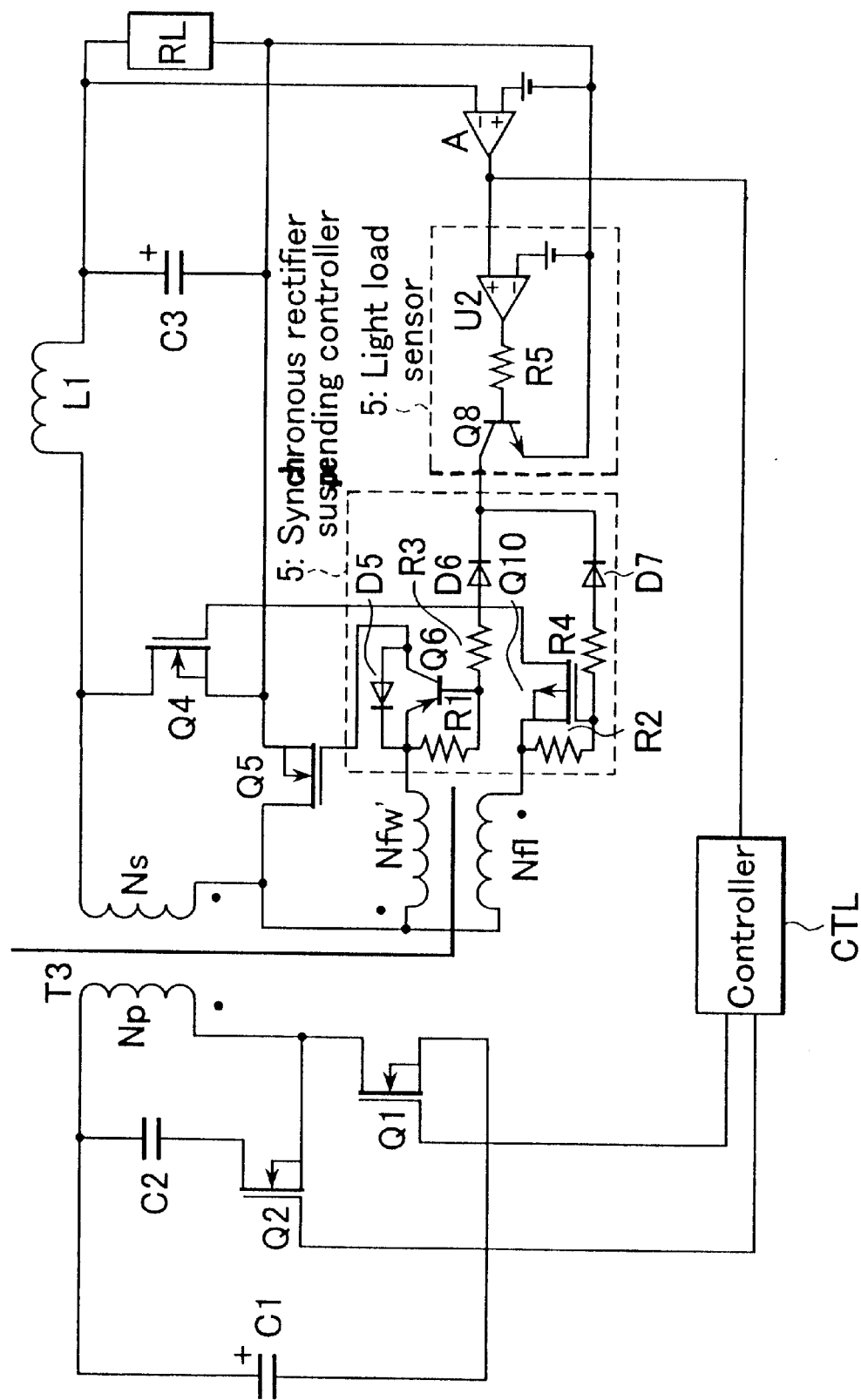
FIG. 25 is a circuit diagram showing a ninth embodiment of the present invention.

In FIG. 25, the transistor Q6, MOSFET Q10, resistors R1 to R4, and diodes D5 to D7 form a synchronous rectifier suspending controller 6 and the windings Np, Ns, Nfw' and Nfl form a transformer T3. More particularly, the synchronous rectifier suspending controller 6 is such that the third switch is composed of the transistor Q5 and the fourth switch is composed of the MOSFET Q10. The transformer T3 is the result of removing the winding Ni from the transformer T2. The general behavior of the DC/DC converter is identical to that of regular DC/DC converters, except that there is no elimination of ripple currents by the winding Ni. Thus, the converter' behavior under a light load is the same as that of the DC/DC converter of FIG. 21 and therefore will not be explained here.

It should be noted that the present invention is in no way limited to the sixth to ninth embodiments. Although reference is made to a system wherein switches are composed of the MOSFETs Q1 to Q5, the switches may be alternatively composed of transistors or relays. In that case, however, the body diodes of the MOSFETs shown in FIG. 21 become unavailable. Therefore, alternative diodes may of course be provided in the same orientations as those of the body diodes.

Although the DC/DC converter is configured without the winding Ni as shown in FIG. 25, the winding Ni may be left as is and the coil L1 may be removed instead.

Alternatively, the DC/DC converter may be configured by providing inductance devices (winding Ni and coil L1) between the source of the MOSFET Q4 and the other end of the capacitor C3.

According to the present invention, the following advantages are offered.

(1) The second controller detects the turning off of the main switching device by means of a voltage change in the sub-switching device, and keeps the sub-switching device turned on for a desired period. This means that the sub-switching device will not turn on as long as the main switching device remains disabled. Consequently, it is possible to prevent energy stored in capacitors from being consumed, and therefore reduce losses.

(2) The second controller detects the turning off of the main switching device from the internal operating waveform of the DC/DC converter. Consequently, there is no need for any circuit for disabling the sub-switching device under a light load. Furthermore, the DC/DC converter does not require any dead-time circuit for preventing the main and sub-switching devices from turning on at the same time.

The first and second controllers are grounded at different potentials and operate independently of each other. Consequently, there is no need for any complex level shift circuit or high-voltage circuit, thus simplifying the converter's circuitry.

The first and second controllers are based on a self-excited control method. This means that when an input power supply wherein an AC power supply output is rectified and smoothed is used, the oscillation frequency varies as the rectified and smoothed voltage varies. Consequently, noise is decentralized and therefore the level of electromagnetic interference (EMI) noise is reduced.

(3) Since the auxiliary winding of a transformer is used as a source of power to the controllers, it is possible to reduce the size and cost of the DC/DC converter.

(4) The turning off of the main switching device is detected by means of a voltage change in the sub-switching device, and the sub-switching device is kept turned on for a desired period. This means that the sub-switching device will not turn on as long as the main switching device remains disabled. Consequently, it is possible to prevent energy stored in capacitors from being consumed, and therefore reduce losses.

(5) The light load sensor detects the light-load state and turns off the first and second switches forming a rectifying circuit. Consequently, it is possible to prevent the first and second switches from malfunctioning because of resonance produced in the primary circuitry when the DC/DC converter is at a stop. In other words, it is possible to prevent the DC/DC converter from supplying energy necessary for the resonance from the secondary circuitry to the primary circuitry. This means that losses at a light load can be avoided.

What is claimed is:

1. A DC/DC converter wherein a main switching device intermittently turns ON power prom a power supply to a primary winding of a voltage converting transformer, said primary winding being parallely connected to an active clamp circuit comprising a capacitor serially connected to a sub-switching device, said converter comprising:
   a first controller means for turning ON and OFF said main switching device according to difference between an output voltage from said DC/DC converter and a desired output voltage; and
   a second controller means for turning ON said sub-switching device for a desired period of time after said main switching device is turned OFF.

2. The converter of claim 1, wherein said first controller means comprises means for providing ON-OFF control according to difference between said converter output voltage and said desired output voltage each time a given length of an OFF state period of said main switching device elapses or after said sub-switching device is turned OFF.

3. The converter of claim 1, further comprising:
   a rectifying circuit for rectifying current produced by a secondary winding of said transformer; and
   a smoothing capacitor for smoothing output of said rectifying circuit.

4. The converter of claim 3, wherein said second controller means comprises a trigger circuit for detecting a voltage change in said sub-switching device and for producing a trigger signal;
   a pulse width circuit for setting said trigger signal to a desired pulse width; and
   a driver circuit to which an output from said pulse width circuit is applied in order to drive said sub-switching device.

5. The converter of claim 1, wherein
   said transformer comprises an auxiliary winding; and
   said second controller means comprises means for turning ON said sub-switching device for a desired period of time after detecting when said main switching device is turned OFF by means of a voltage change in said auxiliary winding.

6. The converter of claim 5, wherein said second controller means comprises:
   a trigger circuit for detecting a voltage change in said auxiliary winding and for producing a trigger signal;
   a pulse width circuit for setting said trigger signal to a desired pulse width; and
   a driver circuit for driving said sub-switching device in response to an output from said pulse width circuit.

7. The converter of claim 1, further comprising:
   a rectifying circuit for rectifying currents produced by a secondary winding of said transformer;
   an auxiliary transformer for detecting a voltage change in said primary winding and for providing isolation; and wherein
   said second controller means comprises means for turning ON said sub-switching device for a desired period of time after detecting when said main switching device is turned OFF by means of a voltage change in said auxiliary transformer.

8. The converter of claim 7, wherein said second controller means comprises:
   a trigger circuit for detecting a voltage change in said auxiliary transformer and for producing a trigger signal;
   a pulse width circuit for setting said trigger signal to a desired pulse width; and
   a driver circuit to which an output of said pulse width circuit is applied to drive said sub-switching device.

9. The converter of claim 3, wherein said transformer further comprises an auxiliary winding; and wherein said first controller comprises means for performing ON-OFF control according to difference between said converter output voltage and said desired output voltage, after detecting when said main switching device is turned OFF each time a given length of an OFF period of said main switching device elapses or by means of a change in said auxiliary winding.

10. The converter of claim 9, wherein said first controller means comprises:
   a trigger circuit for producing a trigger signal by means of a voltage change in said auxiliary winding;
   a restart circuit for providing a restart signal in response to said trigger signal each time a given length of time elapses;
   a pulse width modulation circuit for producing a pulse width modulated signal by means of said trigger circuit, said restart signal,and said difference between said converter output voltage and said desired output voltage; and
   a driver circuit for driving said main switching device in response to said pulse width modulated signal.

11. The converter of claim 9, wherein said first controller means comprising means for performing ON-OFF control according to difference between said converter output voltage and said desired output voltage, after detecting when said sub-switching device is turned OFF each time a given length of an OFF state period period of said main switching device elapses or by means of a voltage change in said main switching device.

12. The converter of claim 11, wherein said first controller means comprises:
   a trigger circuit for producing a trigger circuit in response to a change in voltage of said main switching device;
   a restart circuit for producing a restart signal in response to said trigger signal each time a given length of time elapses;
   a pulse width modulation circuit for producing a pulse width modulated signal by means of said trigger signal, said restart signal and said difference between said output voltage and said desired output voltage; and
   a driver circuit for driving said main switching device in response to said pulse width modulate signal.

13. The converter of claim 3, further comprising:

an auxiliary transformer for detecting a voltage change in said primary winding and for providing isolation; and wherein said first controller means comprises means for performing ON-OFF control according to difference between said output voltage and said desired output voltage, after detecting when said sub-switching device is turned OFF each time a given length of an OFF period of said main switching device elapses, or by means of a voltage change in said auxiliary transformer.

14. The converter of claim 13, wherein said first controller means comprises:

a trigger circuit for producing a trigger signal in response to a voltage change in said auxiliary transformer;

a restart circuit for producing a restart signal in response to said trigger signal each time a given length of time elapses;

a pulse width modulation circuit for producing a pulse width modulated signal by means of said trigger signal, said restart signal, and said difference between said output voltage and said desired output voltage; and a driver circuit for driving said main switching device in response to said pulse width modulated signal.

15. The converter of claim 7, wherein said first auxiliary transformer supplies power to said second controller means.

16. The converter of claim 7, wherein said auxiliary transformer supplies power to said first controller means.

17. The converter of claim 1, wherein said main switching device and said sub-switching device are MOSFETs.

18. The converter of claim 1, wherein said DC/DC converter is of a forward type.

19. The converter of claim 1, wherein said DC/DC converter is of a flyback type.

20. A DC/DC converter of a forward type comprising:

a transformer comprising a primary winding and a secondary winding;

a main switch for intermittently turning ON power from a power supply to said primary winding;

an active circuit comprising a capacitor serially connected to a sub-switch;

a controller means for producing a control signal which alternately turns ON and OFF said main switch and said sub-switch;

a rectifying circuit for rectifying currents produced by said secondary winding, said rectifying circuit comprising a first switch driven by a first drive winding, and a second switch driven by a second drive winding;

an output capacitor to which an output signal from said rectifying signal is applied;

an inductance device provided between said secondary winding and said output capacitor; and a light load sensor for detecting a light load state in an output signal for said DC/DC converter and for turning OFF said first switch and said second switch when said DC/DC converter is under a light load.

21. The converter of claim 20, wherein said inductance device comprises at least a coil or a third winding in said transformer.

22. The converter of claim 20, wherein said light load sensor comprises means for causing said first switch and said second switch to select diode rectification when said DC/DC converter is under light load.

23. The converter of claim 20, further comprising:

a third switch provided between said first drive winding and said first switch; and a fourth switch provided between said second drive winding and said second switch; and wherein said light load sensor comprises means for turning OFF said third switch and said fourth switch when said DC/DC converter is under a light load.

24. The converter of claim 23, wherein diodes are provided in parallel to said third switch and said fourth switch.

25. The converter of claim 20, wherein said first switch and said second switch are MOSFETs.

26. The converter of claim 20, wherein diodes are provided in parallel with said first switch and said second switch.

* * * * *